(12) United States Patent
Miyata

(10) Patent No.: US 8,523,223 B2
(45) Date of Patent: Sep. 3, 2013

(54) FOLDING METHOD OF AIRBAG

(75) Inventor: Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 319 days.

(21) Appl. No.: 12/858,856

(22) Filed: Aug. 18, 2010

(65) Prior Publication Data

US 2011/0042922 A1 Feb. 24, 2011

(30) Foreign Application Priority Data

Aug. 19, 2009 (JP) ................................. 2009-190279

(51) Int. Cl.
*B60R 21/237* (2006.01)
(52) U.S. Cl.
USPC ...................... 280/732; 280/743.1; 280/743.2
(58) Field of Classification Search
USPC ................. 280/728.1, 729, 730.1, 732, 743.1, 280/743.2; 493/458
See application file for complete search history.

(56) References Cited

U.S. PATENT DOCUMENTS

| | | | |
|---|---|---|---|
| 6,834,886 B2 * | 12/2004 | Hasebe et al. ............. | 280/743.1 |
| 7,052,042 B2 * | 5/2006 | Sato et al. .................. | 280/743.1 |
| 7,370,880 B2 | 5/2008 | Hasebe | |
| 7,404,575 B2 * | 7/2008 | Bito et al. .................. | 280/743.1 |
| 7,597,347 B2 * | 10/2009 | Hasebe et al. .............. | 280/729 |
| 7,614,655 B2 | 11/2009 | Hasebe | |
| 7,651,123 B2 | 1/2010 | Hasebe et al. | |
| 7,695,012 B2 * | 4/2010 | Libby et al. ................ | 280/743.1 |
| 7,708,311 B2 * | 5/2010 | Bito ............................. | 280/732 |
| 7,793,975 B2 * | 9/2010 | Fukawatase et al. ...... | 280/743.1 |
| 2006/0049618 A1 * | 3/2006 | Bito ............................. | 280/732 |
| 2007/0018436 A1 * | 1/2007 | Hasebe et al. .............. | 280/729 |
| 2007/0018437 A1 * | 1/2007 | Hasebe et al. .............. | 280/729 |
| 2007/0018438 A1 * | 1/2007 | Hasebe et al. .............. | 280/729 |
| 2007/0024032 A1 * | 2/2007 | Hasebe ....................... | 280/729 |
| 2008/0042415 A1 * | 2/2008 | Hasebe ....................... | 280/743.1 |
| 2008/0061536 A1 * | 3/2008 | Hasebe et al. .............. | 280/729 |
| 2008/0122208 A1 | 5/2008 | Fukawatase et al. | |
| 2009/0295135 A1 * | 12/2009 | Kumagai et al. ........... | 280/743.1 |
| 2012/0126515 A1 * | 5/2012 | Miyata ....................... | 280/730.1 |

FOREIGN PATENT DOCUMENTS

| | | |
|---|---|---|
| JP | 2004-268903 A | 9/2004 |
| JP | 2005-306358 A | 11/2005 |
| JP | 2007-030615 A | 2/2007 |
| JP | 2007-030838 A | 2/2007 |
| JP | 4245590 B2 | 1/2009 |

* cited by examiner

*Primary Examiner* — Joseph Rocca
*Assistant Examiner* — James English
(74) *Attorney, Agent, or Firm* — Fitch, Even, Tabin & Flannery, LLP

(57) ABSTRACT

A folding method of an airbag having a left airbag portion and a right airbag portion is disclosed. In one form, the method includes the steps of: a primary folding step for forming a primary folded body in which said airbag is flattened along a top-bottom direction and along a right-left direction by folding said airbag in a manner that decreases a thickness of said left airbag portion and said right airbag portion along a front-back direction and at least partially separates a left surface of said left airbag portion and a right surface of said right airbag portion along the right-left direction; and a secondary folding step for forming a final folded body by folding said primary folded body in a manner that decreases its width along the top-bottom direction and along the right-left direction.

5 Claims, 24 Drawing Sheets

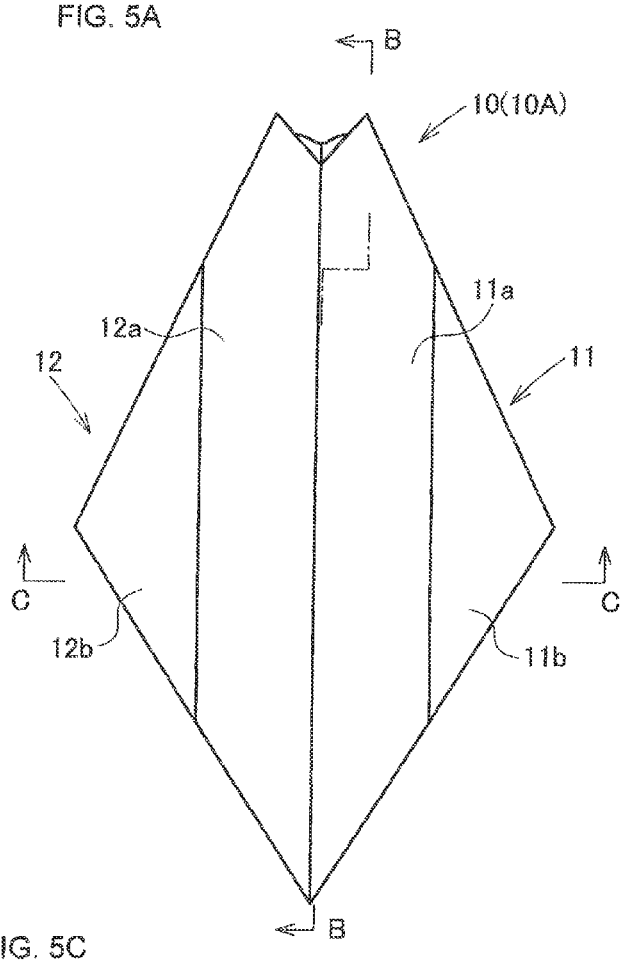
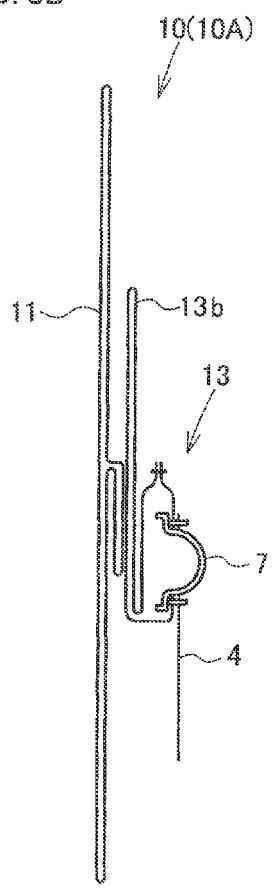
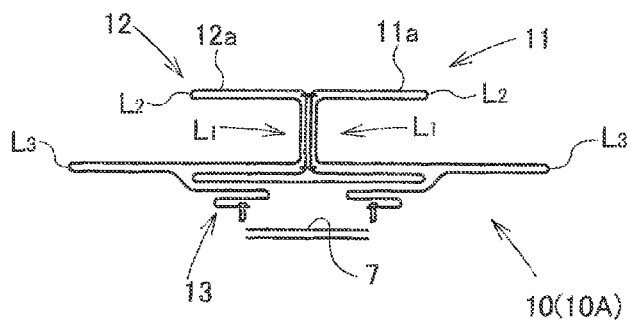

FOLDING METHOD OF AIRBAG

CROSS-REFERENCE TO RELATED APPLICATION

This application claims priority under 35 U.S.C. §119 to Japanese Patent Application No. JP2009-190279 filed on Aug. 19, 2009, the entire content of which is hereby incorporated herein by reference in its entirety.

FIELD OF THE INVENTION

The present invention relates to a folding method of an airbag for restraining an occupant in the event of a vehicle collision or the like. The present invention, more particularly, relates to a folding method of an airbag having a left airbag portion and a right airbag portion that inflate in front of the occupant, on the left side and the right side, respectively. Note that, in this invention, the front-back direction and the horizontal direction correspond to the front-back direction and horizontal direction for the occupant.

BACKGROUND OF THE INVENTION

Airbags that restrain an occupant in the event of a vehicle collision or the like include an airbag that has a left airbag portion and a right airbag portion that inflate in front of the occupant on the left side and the right side, respectively. These left and right airbag portions are inflated by a common inflator. A folding method of this airbag is described in JP, A, 2007-45190.

In the prior art, when the airbag is to be folded, first the left airbag portion and the right airbag portion are each placed sideways. The left airbag portion and the right airbag portion are then respectively flattened in a top-bottom direction and front-back direction. Next, the left airbag portion is folded from the upper end and lower end toward the center along the top-bottom direction into a roll or accordion shape along the top-bottom direction, thereby forming a long, narrow strip-shape in the front-back direction. Similarly, the right airbag portion is folded from the upper end and lower end toward the center into a roll or accordion shape along the top-bottom direction, thereby forming a long, narrow strip-shape in the front-back direction. Subsequently, each of these folded bodies of the left and right airbag portions is folded in a manner that decreases the length in the front-back direction, thereby forming a final folded body of a block shape.

In the prior art, once the left and right airbag portions are folded into long, narrow strip-shapes in the front-back direction, each portion is folded in a manner that decreases its length in the front-back direction. In consequence, when the airbag is inflated, the left and right airbag portions first unfold and deploy in the front-back direction, and subsequently unfold and deploy in the vertical direction, and subsequently deploy in a manner that increases its width in the horizontal direction. As a result, once the airbag begins inflating, a relatively long period of time is required for the left and right airbag portions to deploy across a wide range in the vertical and horizontal directions.

SUMMARY OF THE INVENTION

It is therefore an object of the present invention to provide a folding method of an airbag that permits deployment of the left and right airbag portions across a wide range in the top-bottom and right-left directions in a short period of time once the airbag begins to inflate.

In order to acheive the above-mentioned object, according to the first invention, there is provided a folding method of an airbag comprising a left airbag portion that inflates on the left side in front of an occupant, and a right airbag portion that inflates on the right side in front of an occupant, comprising the steps of: a primary folding step for forming a primary folded body in which the airbag is substantially flattened along a top-bottom direction and along a right-left direction by folding the airbag in a manner that decreases a thickness of the left airbag portion and the right airbag portion along a substantially front-back direction and at least partially separates a left surface of the left airbag portion and a right surface of the right airbag portion along the right-left direction; and a secondary folding step for forming a final folded body by folding the primary folded body in a manner that decreases its width substantially along the top-bottom direction and along the right-left direction.

According to the second invention, in the folding method of an airbag according to the first invention, in the secondary folding step, an upper end portion, a lower end portion, a left end portion, and a right end portion of the primary folded body are each folded toward a center of the primary folded body along the top-bottom direction and along the right-left direction.

According to the third invention, in the folding method of an airbag according to the second invention, in the secondary folding step, at least one of an upper end portion, a lower end portion, a left end portion, and a right end portion of the primary folded body is folded toward a center of the primary folded body into a roll shape along the top-bottom direction and along the right-left direction.

According to the fourth invention, in the folding method of an airbag according to the first invention, in the secondary folding step, the primary folded body is folded in a manner that decreases its width along the right-left direction, and subsequently folded in a manner that decreases its width along the top-bottom direction.

According to the fifth invention, in the folding method of an airbag according to the fourth invention, in the secondary folding step, the primary folded body is folded in a manner that decreases its width along the top-bottom direction by respectively folding an upper end portion and a lower end portion of the primary folded body toward a center of the primary folded body along the top-bottom direction, and then positioning a folded body of the upper end portion on a top side of a folded body of the lower end portion.

According to the sixth invention, in the folding method of an airbag according to the fifth invention, the airbag inflates from an instrument panel of a vehicle toward the vehicle rear, bringing the airbag close to an occupant, and further comprises a hollow portion disposed between the left airbag portion and the right airbag portion, that passes substantially vertically through the airbag when the airbag is in an inflated state; and at least a part of the hollow portion is positioned further toward the vehicle rear than an end portion of an instrument panel on the vehicle rear side when the airbag is in an inflated state.

According to the seventh invention, in the folding method of an airbag according to the first invention, the airbag further comprises connecting members including a connect member that is provided at a intermediate part of the left airbag portion along the front-back direction at the time of inflation and connects left and right lateral surfaces of the left airbag portion, and another connecting member that is provided at a intermediate part of the right airbag portion along the front-back direction at the time of inflation and connects left and right lateral surfaces of the right airbag portion; and in the primary folding step, the airbag is extended along the right-left direction by along the right-left direction separating an end of a left surface of the left airbag portion that is further rearward than the connecting members and an end of a right surface of the right airbag portion that is further rearward than the connecting members, and along the right-left direction separating an end of a left surface of the left airbag portion that is further frontward than the connecting members and an end of a right surface of the right airbag portion that is further frontward than the connecting members.

According to the eighth invention, in the folding method of an airbag according to the seventh invention, in the secondary folding step, an end portion of the left airbag portion that is further rearward than the connecting members and an end portion of the right airbag portion that is further rearward than the connecting members are folded toward a center of the primary folded body along the right-left direction, and an end portion of the left airbag portion that is further frontward than the connecting members and an end portion of the right airbag portion that is further frontward that the connecting members are folded toward a center of the primary folded body along the right-left direction.

According to the folding method of the airbag of the present invention, the airbag is first folded in a manner that decreases the thickness of the left and right airbag portions in a substantially front-back direction and at least partially separates the left surface of the left airbag portion and the right surface of the right airbag portion along a right-left direction. With this arrangement, a primary folded body that is flattened in the substantially top-bottom and right-left directions is formed (primary folding step). Subsequently, this primary folded body is folded in a manner that decreases its width in the substantially top-bottom and right-left directions, thereby forming a final folded body (secondary folding step). As a result, when the airbag starts to inflate, the airbag first unfolds and deploys in the top-bottom and right-left directions and subsequently increases in thickness in the front-back direction. With this arrangement, after inflation begins, the airbag is capable of deploying across a wide range in the top-bottom and right-left directions in a short period of time. As a result, even in a case where the airbag starts inflating with the occupant seated relatively forward, causing the occupant to contact the airbag in the early stages while the airbag is being inflated, the airbag is capable of receiving the body of the occupant across a wide range. With this arrangement, when the occupant contacts the airbag during inflation, the load locally applied to the head and neck regions of the occupant is suppressed, In the present invention, during airbag inflation, the left airbag portion inflates on the front left side of the occupant to receive the left side of the thorax of the occupant, and the right airbag portion inflates on the front right side of the occupant to receive the right side of the thorax of the occupant. Since hard, strong ribs exist in the left and right sides of the thorax, the left and right airbag portions are capable of securely receiving the occupant.

In the secondary folding step, the upper end, lower end, left end, and right end of the primary folded body are each preferably folded toward the center of the primary folded body along the top-bottom direction and the right-left direction. When thus folded, at the time of inflation the airbag inflates quickly and substantially evenly along a top-bottom direction and along a right-left direction.

In this case, the upper end, lower end, left end, and right end of the primary folded body of the airbag are preferably at least partially folded into a roll toward the center of the primary folded body along the top-bottom direction and the right-left direction. When the airbag is thus folded, at the time of inflation the portions folded into a roll inflate and deploy while unrolling toward the outside of the airbag. At this time, inflation continues in order from the unrolled portions, causing the portions folded into a roll to inflate substantially equally in the axial direction and substantially parallel direction of the rolls. That is, the upper end and lower end of the primary folded body inflate substantially equally in the right-left direction, and the left end and right end of the primary folded body inflate substantially equally in the top-bottom direction.

In the secondary folding step, once the primary folded body is folded in a manner that decreases its width along the right-left direction, that folded primary folded body may be folded in a mariner that decreases its width along the top-bottom direction. In such a case, once the airbag starts to inflate, the airbag quickly inflates along the top-bottom direction.

In such a case, in the secondary folding step, once the upper and lower ends of the primary folded body are each folded toward the center of the primary folded body along the top-bottom direction, the folded body of the upper end is preferably positioned above the folded body of the lower end, thereby decreasing the width of the primary folded body along the top-bottom direction. When the airbag is thus folded, the upper end of the airbag deploys faster than the lower end, causing the airbag to deploy in front of the head and thorax regions of the occupant in a short period of time. With this arrangement, even if an object is present in the vicinity of the airbag device installation area such as the instrument panel when the airbag inflates, for example, the airbag inflates and deploys toward the vehicle rear, passing over the object. As a result, the invention keeps the inflating airbag from excessively pressing the object located in the vicinity of the airbag device installation area toward the rear.

This folding method is ideally applied to airbags having the configuration described below. That is, the folding method is ideally applied to airbags configured so that a hollow portion that passes substantially vertically through the inflated airbag is provided between the left and right airbag portions, and at least a part of the lower end of the hollow portion is positioned further toward the vehicle rear than the end of the instrument panel on the vehicle rear side when the airbag in an inflated state. With this airbag, even if an object is present in the vicinity of the instrument panel when the airbag inflates, the object is engulfed in the hollow portion. When the airbag is folded using the above folding method, when the airbag inflates, the airbag inflates and deploys toward the vehicle rear, passing over the object located in the vicinity of the instrument panel as described above. Subsequently, the airbag inflates downward, covering the object from above, thereby engulfing the object in the hollow portion of the airbag.

Additionally, the airbag may be provided with connecting members in the intermediate part of the left airbag portion and the right airbag portion in the front-back direction at the time of inflation, respectively, that connect the left and right surfaces of the left airbag portion, and the left and right surfaces of the right airbag portion. In such a case, in the primary folding step, the airbag is preferably along a right-left direction extended by along a right-left direction separating the ends of the left and right airbag portions that are further rearward than the connecting members of the left surface of the left airbag portion and the right surface of the right airbag portion, and along a right-left direction separating the ends of the left and right airbag portions that are further frontward than the connecting members of the left surface of the left airbag portion and the right surface of the right airbag portion. With the airbag thus folded, the airbag is capable of sufficiently extending in the right-left direction, even when the airbag is provided with connecting members that connect the lateral surfaces of the left and right airbag portions.

In such a case, in the secondary folding step, the ends of the left and right airbag portions that are further rearward than the connecting members are preferably folded toward the center of the primary folded body along the right-left direction, and the ends of the left and right airbag portions that are further frontward than the connecting members are preferably folded toward the center of the primary folded body along the right-left direction. With the airbag thus folded, when the airbag inflates, the ends of the left and right airbag portions that are further rearward than the connecting members and the ends of the left and right airbag portions that are further frontward than the connecting members each deploy along a right-left direction, resulting in quick deployment of the airbag in the horizontal direction. Accordingly, the ends of the left and right airbag portions that are further rearward than the connecting members and the ends of the left and right airbag portions that are further frontward than the connecting members each inflate in a manner that increases the thickness in the front-back direction. As a result, quick deployment of the airbag in the front-back direction is achieved as well,

BRIEF DESCRIPTION OF THE DRAWINGS

FIG. 5A is a front view of the primary folded body of the airbag.

FIG. 5B is a cross-sectional view taken along section B-B in FIG. 5A.

FIG. 5C is a cross-sectional view taken along section C-C in FIG. 5A.

DETAILED DESCRIPTION OF THE PREFERRED EMBODIMENTS

Embodiments of the present invention will now be described with reference to accompanying drawings.

Figure 1:
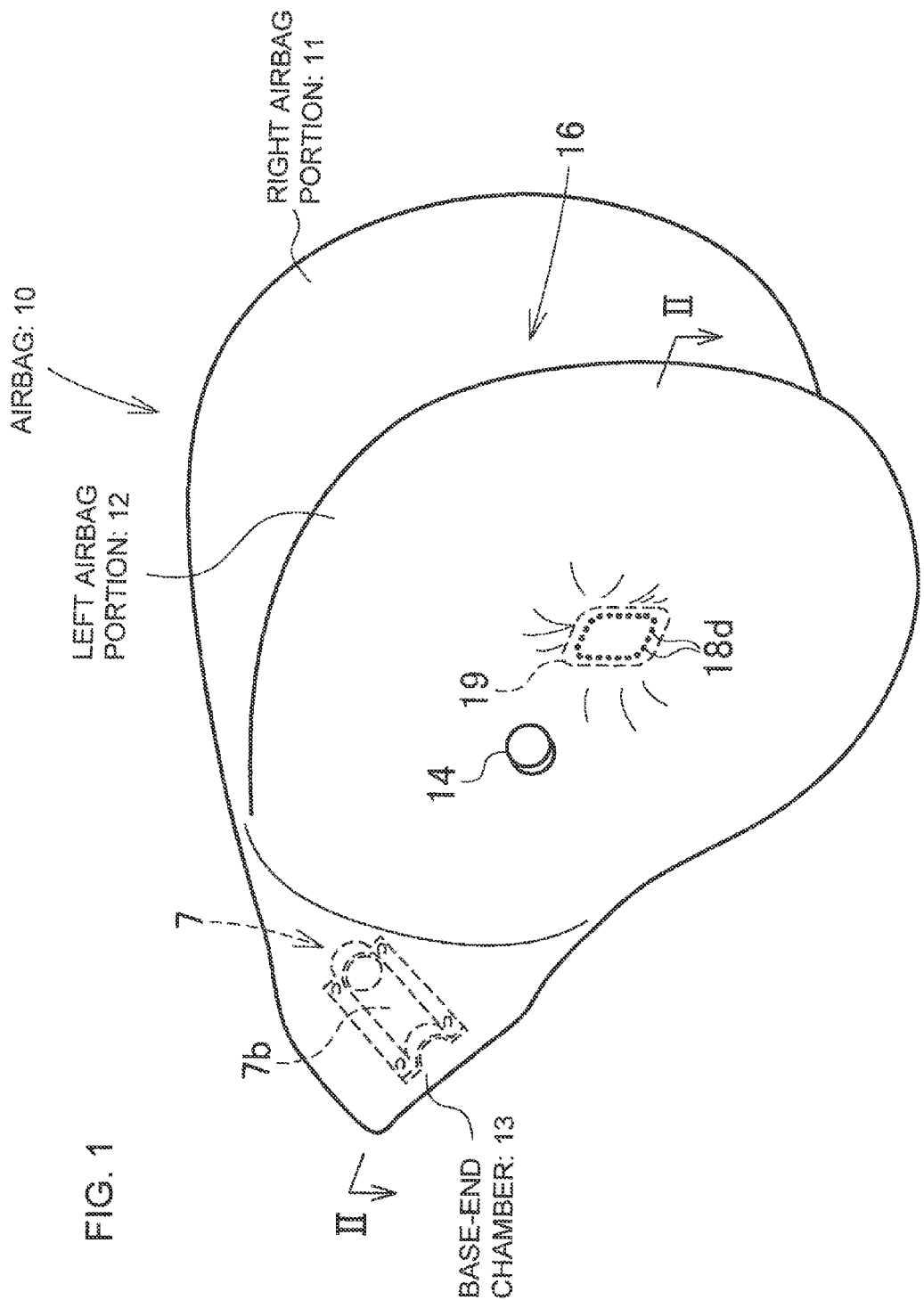
FIG. 1 is a perspective view of the airbag to be folded using the folding method of an airbag according to an embodiment of the present invention.
Figure 2:
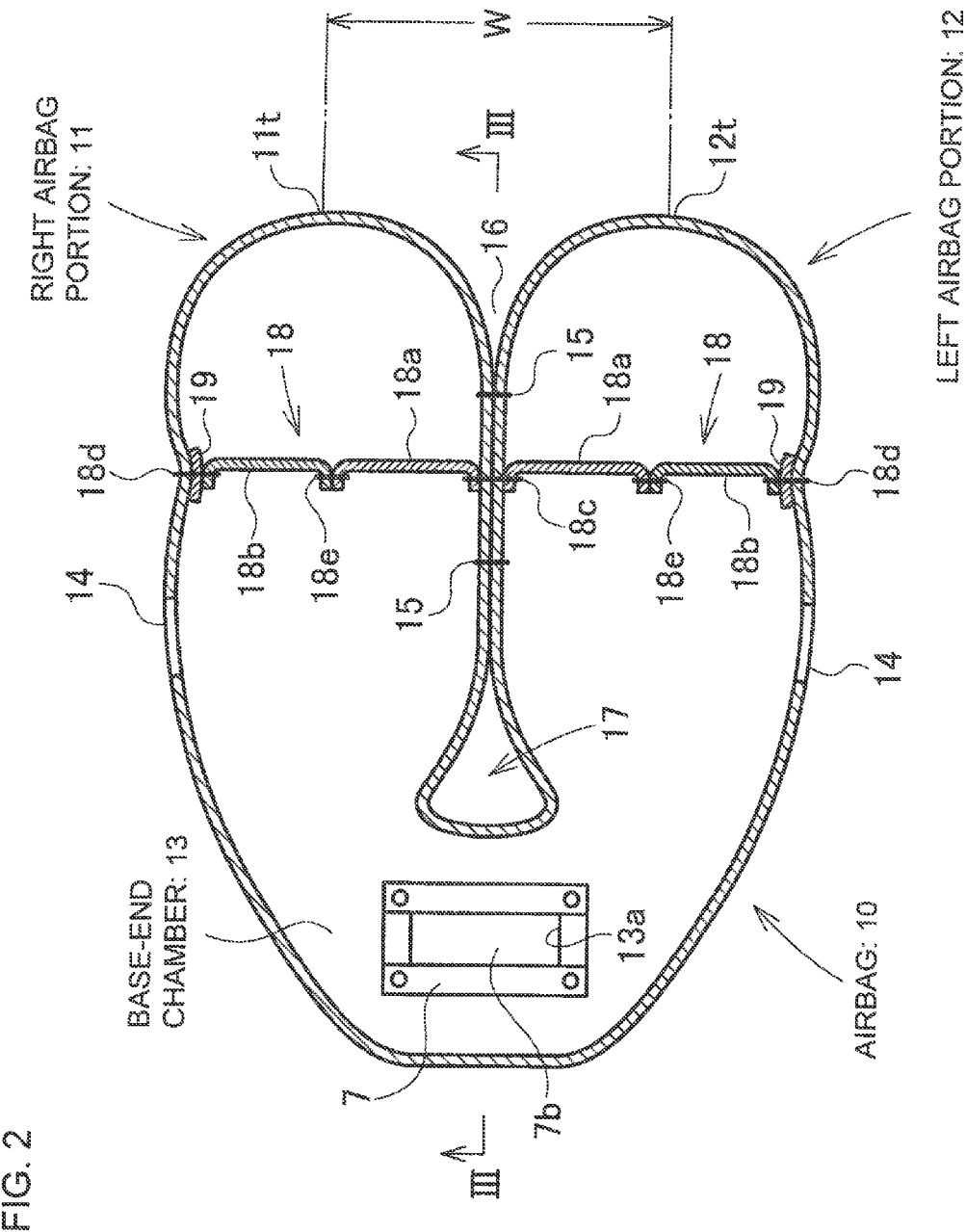
FIG. 2 is a cross-sectional view taken along section II-II in FIG. 1.
Figure 3:
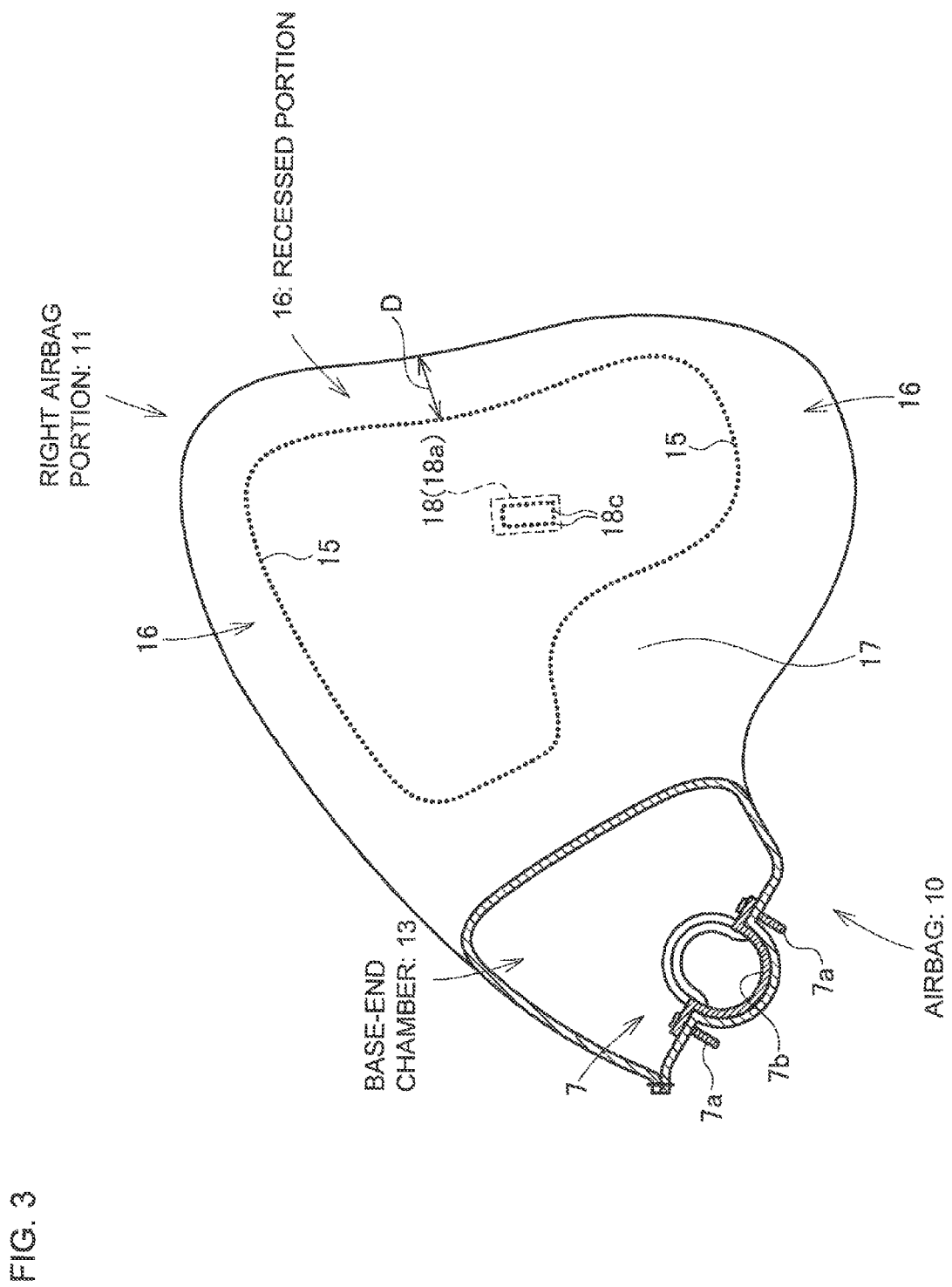
FIG. 3 is a cross-sectional view taken along section in FIG. 2.
Figure 4:
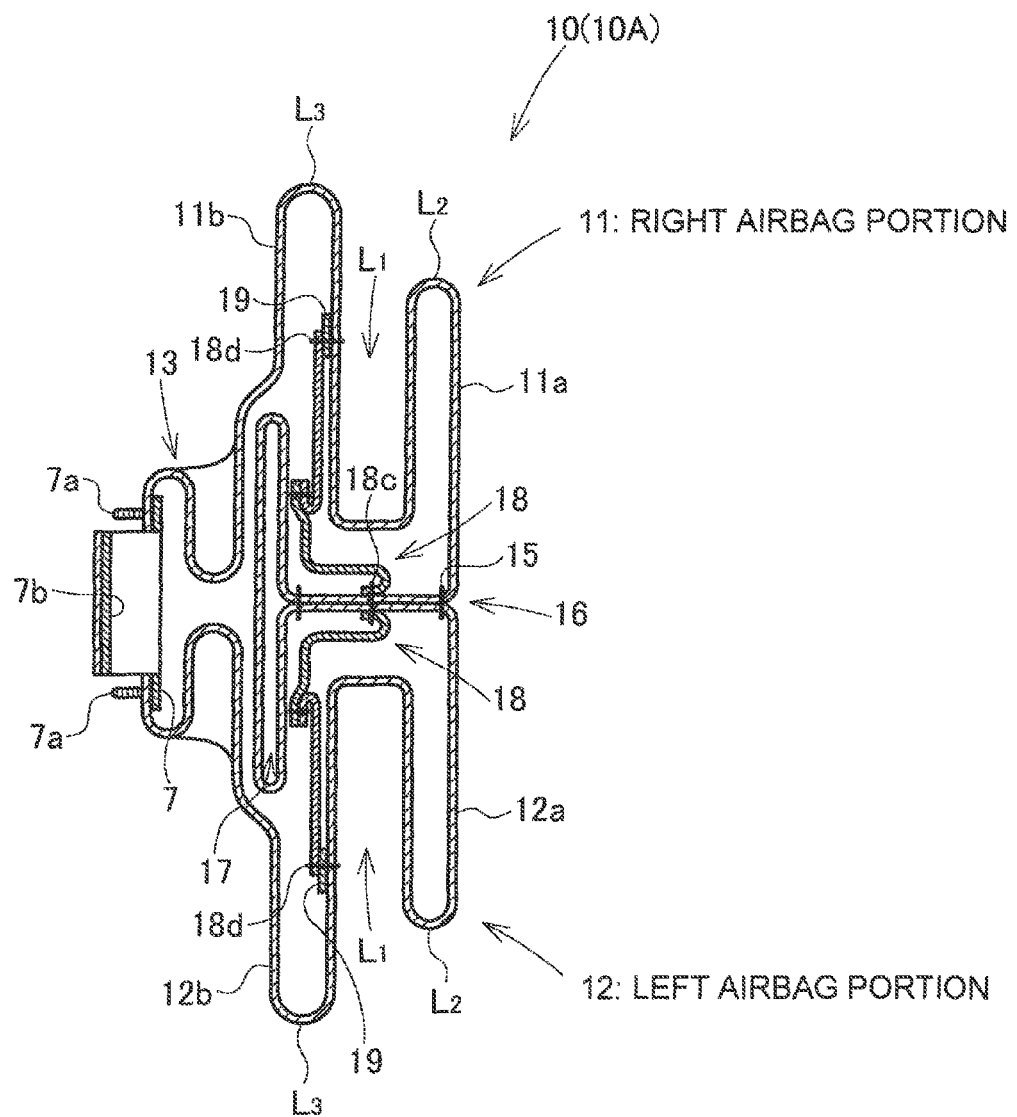
FIG. 4 is a cross-sectional view of the same section as FIG. 2, illustrating the primary folding method of the airbag.
Figure 6:
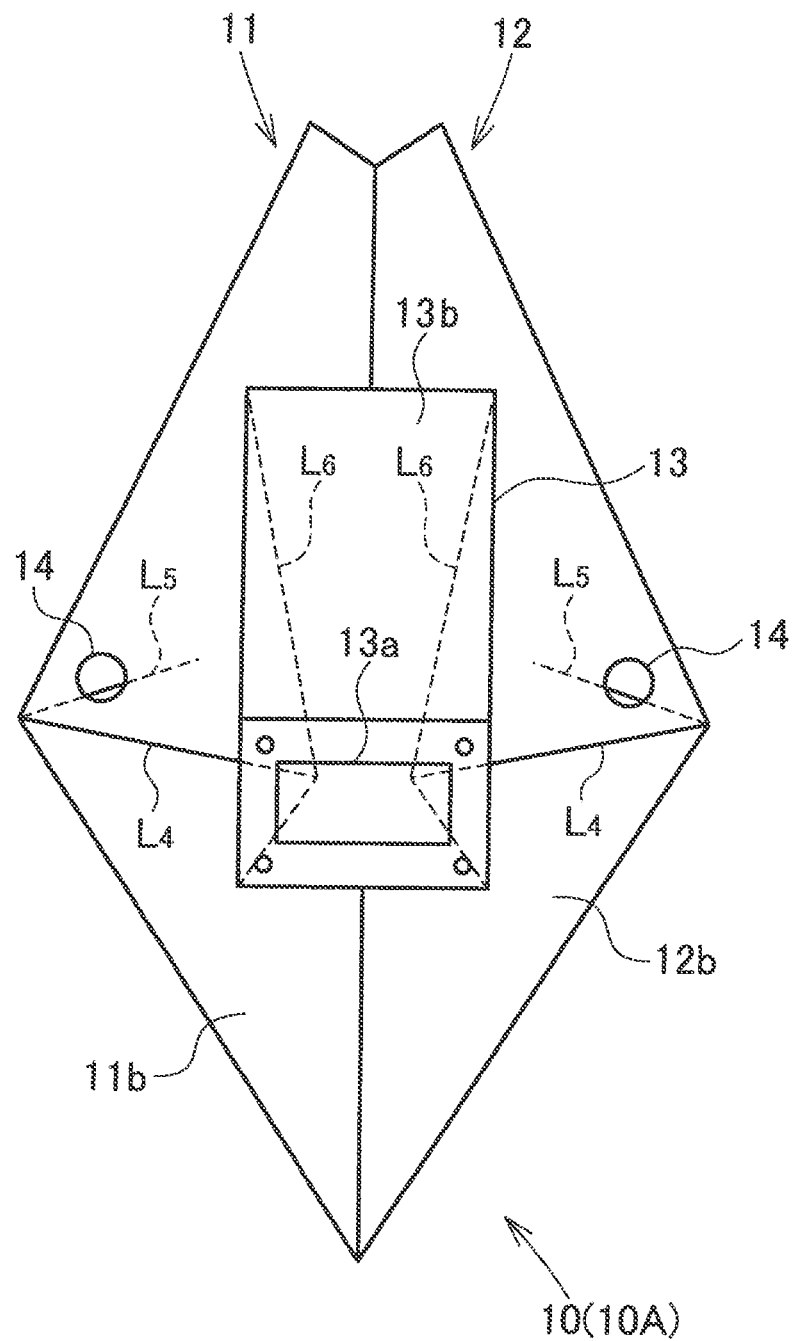
FIG. 6 is a rear view of the primary folded body of the airbag.
Figure 22:
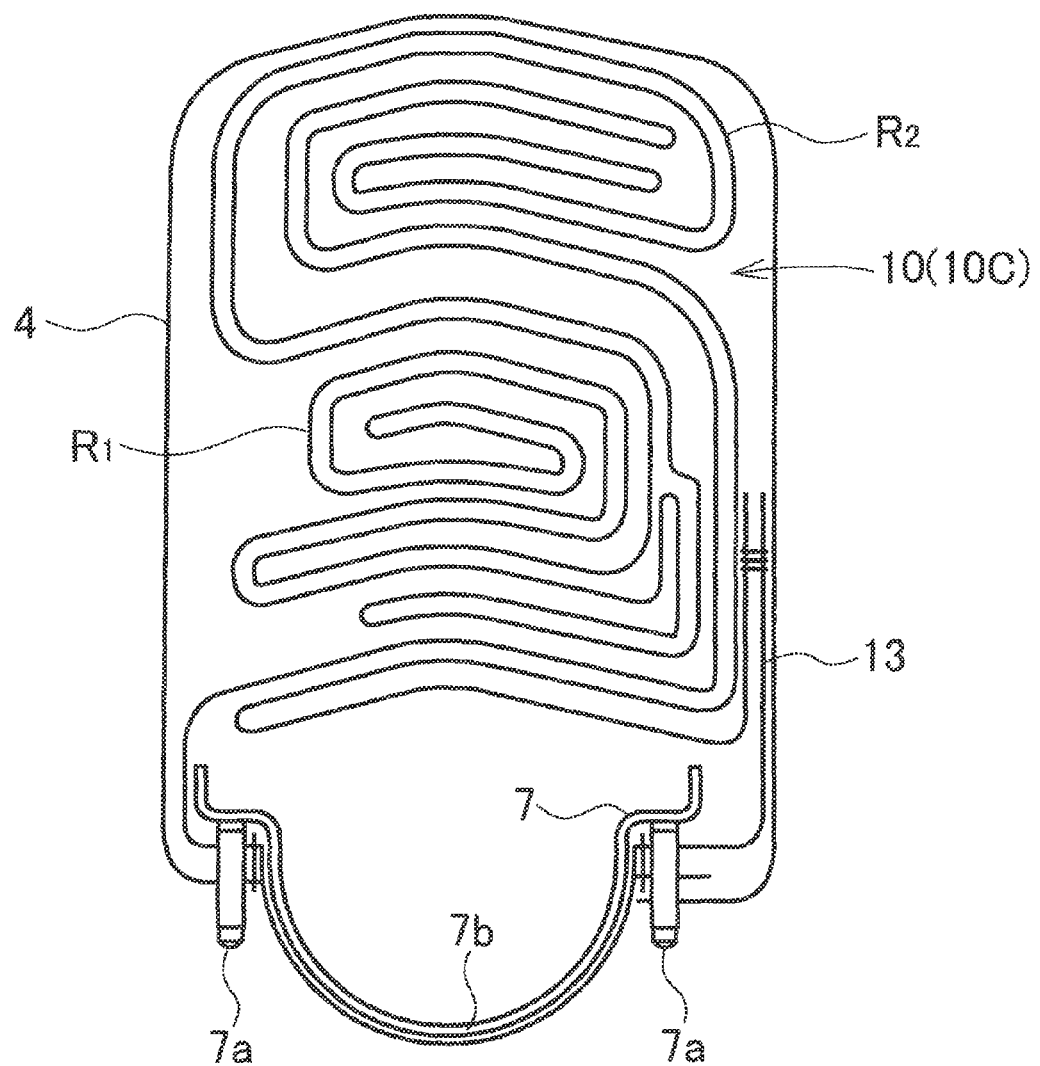
FIG. 22 is a cross-sectional view of the same section as FIG. 13B, illustrating the final folded shape of the airbag.
Figure 23A:
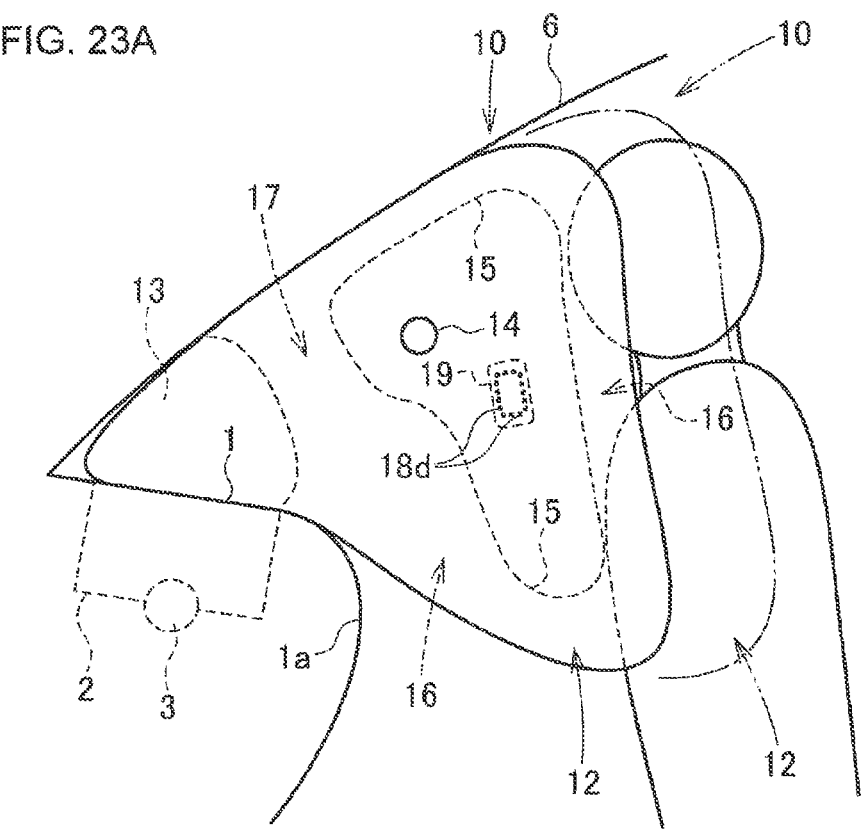
FIG. 23 is a side view at the time of airbag inflation and a top view at the time of airbag inflation.
Figure 23B:
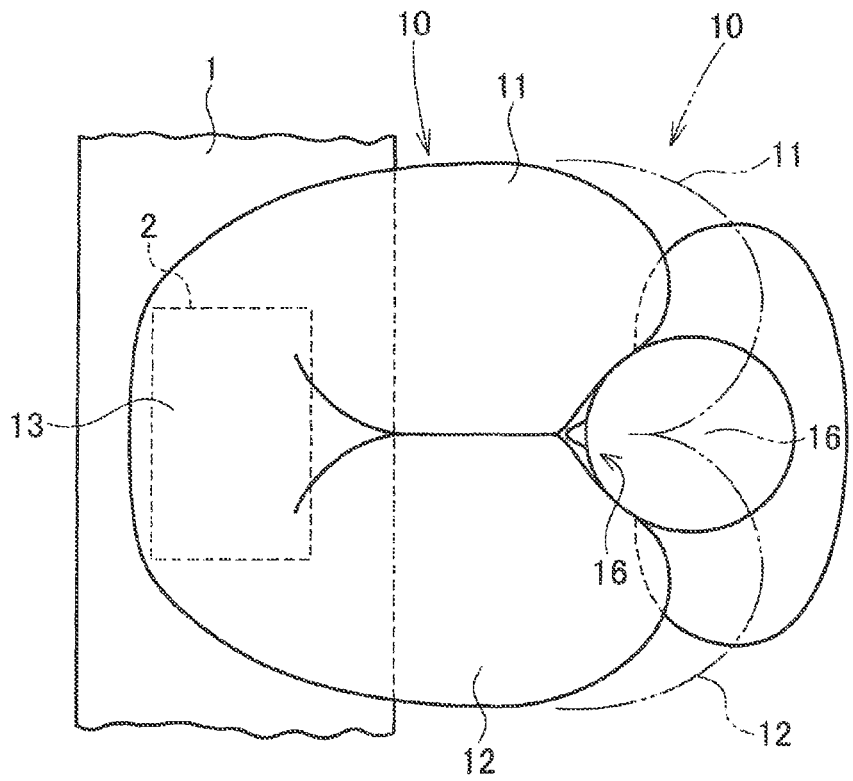
Figure 24A:
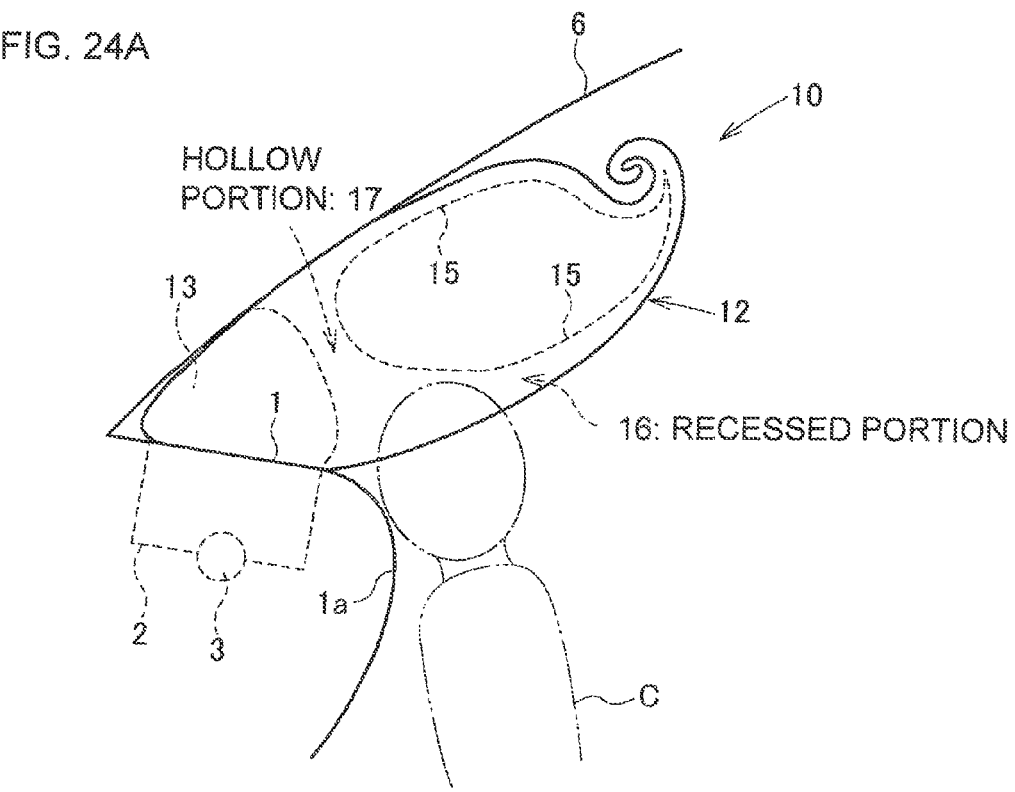
FIG. 24 is a side view of the airbag during inflation, and a side view of the fully inflated airbag.
Figure 24B:
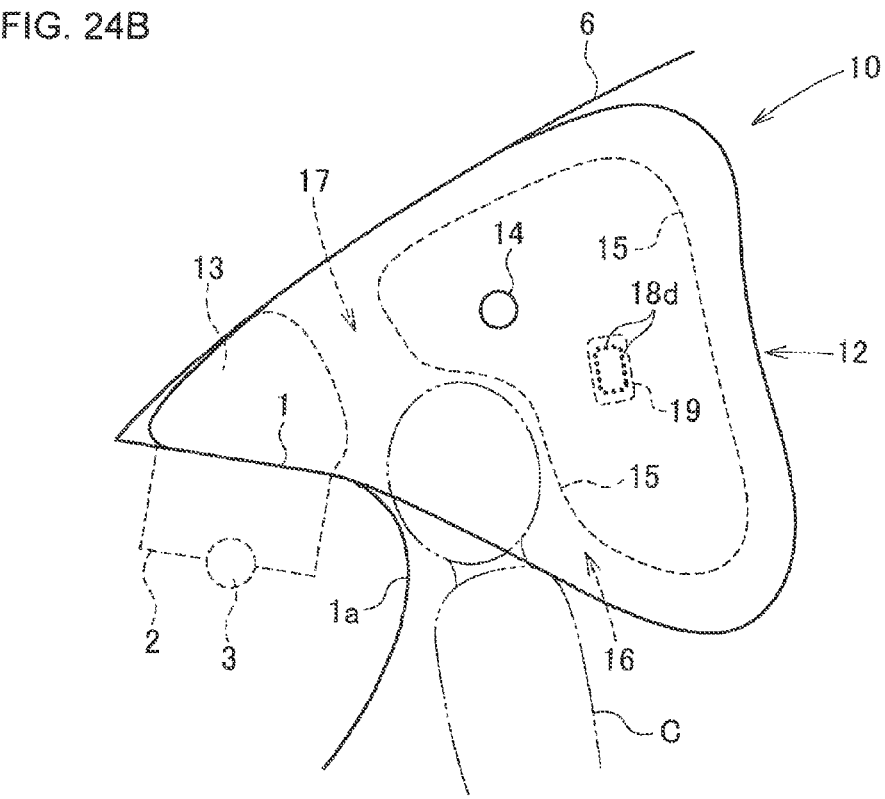

FIG. 1 is a perspective view of the airbag to be folded using the folding method of an airbag according to the embodiment. FIG. 2 is a cross-sectional view taken along line 1141 in FIG. 1. FIG. 3 is a cross-sectional view taken along line in FIG. 2. FIG. 4 is a cross-sectional view of the same section as FIG. 2, illustrating the primary folding method of the airbag. FIG. 5A is a front view of the primary folded body of the airbag, FIG. 5B is a cross-sectional view taken along line B-B in FIG. 5A, and FIG. 5C is a cross-sectional view taken along line C-C in FIG. 5A. FIG. 6 is a rear view of the primary folded body of the airbag. FIG. 7A to FIG. 21 are explanatory views of the secondary folding method of the airbag. Note that FIG. 7A, FIG. 8A, FIG. 9A, FIG. 10A, FIG. 11A, FIG. 12A, and FIG. 13A are front views of the airbag; and FIG. 7B, FIG. 8B, FIG. 9B, FIG. 10B, FIG. 11B, FIG. 12B, and FIG. 13B are cross-sectional views taken along line B-B of FIG. 7A, FIG. 8A, FIG. 9A, FIG. 10A, FIG. 11A, FIG. 12A, and FIG. 13A, respectively. In FIG. 5B, FIG. 7B, FIG. 8B, FIG. 9B, FIG. 10B, FIG. 11B, and FIG. 12B, the image of the connecting bands for restraining the horizontal widths of the right and left airbag portions during inflation is omitted. FIG. 14 to FIG. 21 are cross-sectional views of the same section as FIG. 13B. FIG. 22 is a cross-sectional view of the same section as FIG. 13B, illustrating the final folded shape of the airbag. FIG. 23A is a side view of the inflated airbag, and FIG. 23B is a top view of the inflated airbag. FIG. 24A is a side view of the airbag during inflation, and FIG. 24B is a side view of the fully inflated airbag. Note that FIG. 23A and FIG. 23B illustrate a state where the occupant is positioned relatively forward, and FIG. 24A and FIG. 24B illustrate a state where an object (including the occupant) is present in the vicinity of the instrument panel.

In the description below, the front-back direction and horizontal direction correspond to the front-back direction and horizontal direction for the occupant of the vehicle, respectively. Additionally, the phrase "mountain-fold the airbag" means to fold the airbag so that the folding line extends outward toward the outside of the airbag, and the phrase "valley-fold the airbag" means to fold the airbag so that the folding line extends inward toward the inside of the airbag.

In this embodiment, an airbag 10 is a passenger seat airbag provided to a passenger seat airbag device for restraining a passenger seat occupant of a vehicle. As illustrated in FIG. 23A and FIG. 23B, the passenger seat airbag device comprises the airbag 10, a retainer 2 of an upper opening container shape that is positioned in a dashboard 1 in front of the passenger seat of the vehicle and houses the folded airbag 10, an inflator 3 for inflating the airbag 10, and a strip-shaped shape-holding sheet 4 for holding the shape of the folded body of the airbag 10 (refer to FIG. 22). Reference numeral 6 denotes a windshield above the instrument panel 1. The retainer 2 is disposed behind the instrument panel 1. A door portion (not shown) that opens when the airbag 10 inflates, permitting inflation and emergence into the vehicle interior of the airbag 10, is formed on the instrument panel 1. Note that the lid (lid material) formed separately from the instrument panel 1 is sometimes mounted to the upper opening of the retainer 2.

The airbag 10 comprises a right airbag portion 11 that inflates on the right side in front of the occupant, a left airbag portion 12 that inflates on the left side in front of the occupant, and a base-end chamber 13 that passes through the base end of the right airbag portion 11 and the left airbag portion 12. A gas inlet 13a that introduces gas from the inflator 3 is provided on the front end of the bottom of the base-end chamber 13.

A press plate 7 for connecting the airbag 10 to the retainer 2 is overlaid on the periphery portion of the gas inlet 13a from inside the base-end chamber 13. From the press plate 7, a plurality of stud bolts 7a is provided. Each of the stud bolts 7a passes through the periphery portion of the gas inlet 13a and extends to the outside of the airbag 10. A substantially cylindrical inflator holding portion 7b for holding the cylindrical inflator 3 is provided on the press plate 7.

The gas from the inflator 3 is introduced from the gas inlet 13a into the base-end chamber 13, inflating the base-end chamber 13, and subsequently introduced from the base-end chamber 13 into the right airbag portion 11 and the left airbag portion 12, inflating the right airbag portion 11 and the left airbag portion 12. A vent hole 14 is provided to both the right surface of the inflated right airbag portion 11 and the left surface of the inflated left airbag portion 12 (hereinafter sometimes referred to as the outer lateral surfaces of the right airbag portion 11 and the left airbag portion 12).

In this embodiment, within the region of the surfaces of the right airbag portion 11 and the left airbag portion 12 that face each other at the time of inflation, the intermediate part of the left surface of the right airbag portion 11 in the front-back direction and the intermediate part of the right surface of the left airbag portion 12 in the front-back direction are stitched together by a seam 15. This seam 15 extends in a circular shape as illustrated by FIG. 2 and FIG. 3. On the surfaces that face each other, the seam 15 makes a circle more toward the center in the vertical direction and front-back direction than on the upper surface, lower surface, or rear surface (the surface faced the occupant) of the right airbag portion 11 and the left airbag portion 12 in an inflated state. With this arrangement, a continuous recessed portion 16 between the upper surfaces, the lower surfaces, and the rear surfaces of the right airbag portion 11 and the left airbag portion 12 is formed when the right airbag portion 11 and the left airbag portion 12 are in an inflated state.

When the airbag 10 is fully inflated, the recessed portion 16 opens toward the occupant (that is, toward the right in FIG. 1 to FIG. 4) since a connecting member such as a tie panel does not exist between the rear end parts of the right airbag portion 11 and the left airbag portion 12. The inmost part of the recessed portion 16 is the seam 15. When this airbag 10 is fully inflated, as shown in FIG. 2, a distance W between an aft end 11t of the right airbag portion 11 and an aft end 12t of the left airbag portion 14 is preferably 150 to 450 mm, more preferably 170 to 430 mm. Further, when this airbag 10 is fully inflated, a depth D (refer to FIG. 3) of the recessed portion 16 on the rear surface of the right air bag portion 11 and the left airbag portion 12 is preferably 25 to 400 mm, more preferably 50 to 350 mm.

As illustrated in FIG. 3, the front end of the seam 15 is separated from the rear end of the base-end chamber 13. A hollow portion 17 that passes substantially vertically through the right airbag portion 11 and the left airbag portion 12 exists between the front end of the seam 15 and the rear end of the base-end chamber 13. As illustrated in FIG. 3, the more the hollow portion 17 is in a lower end from the vertical intermediate part of the hollow portion 17, the more a width of the hollow portion 17 along the front-back direction is greater when the right airbag portion 11 and the left airbag portion 12 are inflated. With this hollow portion 17, the depth of the recessed portion 16 on the lower surface of the right airbag portion 11 and the left airbag portion 12 increases all the way to the base-end chamber 13. As illustrated in FIG. 24B, when the airbag 10 is fully inflated, at least a part of the lower end of the hollow portion 17 is positioned further toward the vehicle rear than a rear end portion 1a of the instrument panel 1. That is, with the airbag 10 fully inflated, at least one part of the opening on the lower end of the hollow portion 17 is exposed on the lower surface of the airbag 10, closer to the vehicle rear than the rear end portion 1a of the instrument panel 1. Therefore, as shown in FIG. 24B, even if an object C is present in the vicinity of the instrument panel 1 when the airbag 10 inflates, the object C is engulfed by the hollow portion 17.

In this embodiment, a connecting band 18 is provided as a connecting member to both the right airbag portion 11 and the left airbag portion 12, near the middle in both the vertical direction and front-back direction at the time of inflation, to connect the lateral surfaces of the right airbag portion 11 and the left airbag portion 12 and restrict the horizontal width during inflation. As illustrated in FIG. 2, the connecting bands 18 are disposed so that they cross in the substantially right-left direction inside the right airbag portion 11 and the left airbag portion 12, respectively, and both ends connect to the left and right surfaces of the right airbag portion 11 and the left airbag portion 12, respectively.

As illustrated in FIG. 2, each of the connecting bands 18 comprises a first band member 18a having one end connected to the left surface of the right airbag portion 11 or the right surface of the left airbag portion 12 (that is, the face-to-face surfaces), and a second band member 18b having one end connected to the right surface of the right airbag portion 11 or the left surface of the left airbag portion 12 (that is, the outer lateral surfaces). The other end of the band member 18a and the other end of the band member 18b are joined inside the right airbag portion 11 and inside the left airbag portion 12, respectively. With this arrangement, each of the connecting bands 18 connects the lateral surface of the right airbag portion 11 and the lateral surface of the left airbag portion 12. Reference numeral 18c denotes a seam that stitches together one end of each of the first band members 18a with the surface facing the right airbag portion 11 and the left airbag portion 12, respectively. Reference numeral 18d denotes a seam that stitches together one end of each of the second band members 18b with the outer lateral surface of the right airbag portion 11 and the left airbag portion 12, respectively. Reference numeral 18e denotes a seam that stitches together the other end of the right airbag portion 11 with the other end of the left airbag portion 12. Reference numeral 19 (refer to FIG. 1) denotes a reinforcing fabric that reinforces the stitched part of each of the second band members 18h and the right airbag portion 11 and the outer lateral surface of the left airbag portion 12. In this embodiment, one end of the first band member 18a inside the right airbag portion 11 and one end of the first band member 18a inside the left airbag portion 12 sandwich the surfaces of the right airbag portion 11 and the left airbag portion 12 that face each other, and are stitched together by a common seam 18c. The seam 15 that is the inmost part of the recessed portion 16 surrounds this seam 18c.

When the airbag 10 is folded, the airbag 10 is first folded in a manner that decreases the thickness of the right airbag portion 11 and the left airbag portion 12 in the substantially front-back direction, and at least partially separates the right surface of the right airbag portion 11 and the left surface of the left airbag portion 12 along a right-left direction, as illustrated in FIGS. 4 to 6. With this arrangement, a primary folded body 10A that is flattened along the top-bottom direction and the right-left direction is formed (primary folding step). Subsequently, this primary folded body 10A is folded in a manner that decreases its width along the top-bottom direction and the right-left direction to form a final folded body 10C, as illustrated in FIG. 7A to FIG. 20 (secondary folding step). The folding method of the airbag 10 will now be described in detail.

Primary Folding Step

When the airbag 10 is to be subjected to the primary folding process, the airbag 10 is placed on a substantially horizontal table with the base-end chamber 13 (or the rear end of the right airbag portion 11 and the left airbag portion 12) at the bottom, for example. Then, while extending the airbag 10 in the right-left direction, the airbag 10 is flattened in the substantially front-back direction (in the substantially top-bottom direction when placed on the table as described above; hereinafter the same).

At this time, in this embodiment, the intermediate part of the right surface of the right airbag portion 11 in the front-back direction and the intermediate part of the left surface of the left airbag portion 12 in the front-back direction are each valley-folded along a substantially top-bottom (substantially right-left with the airbag 10 placed on the table as described above) folding line $L_1$ of the airbag 10, and the intermediate part of the right surface of the right airbag portion 11 in the front-back direction and the intermediate part of the left surface of the left airbag portion 12 in the front-back direction are brought near the surfaces of the right airbag portion 11 and the left airbag portion 12 that face each other, as illustrated in FIG. 4 and FIG. 5C. Note that while in this embodiment the folding line $L_1$ is positioned on the right surface of the right airbag portion 11 and the left surface of the left airbag portion 12, slightly further toward the rear end of the right airbag portion 11 and the left airbag portion 12 than the seam 18d that stitches together each of the connecting bands 18, the position of the folding line $L_1$ is not limited thereto.

Additionally, the area of the right surface of the right airbag portion 11 and the area of the left surface of the left airbag portion 12 that are near the center between the folding line $L_1$ and the inner-most area of the recessed portion 16 on the rear surface of the airbag 10 (that is, the rear end of the seam 15) are each pulled along a right-left direction to separate the area near the center of the right airbag portion 11 and the area near the center of the left airbag portion 12, while creating a mountain-fold along a substantially top-bottom folding line $L_2$. Note that this folding line $L_2$, is positioned on the right surface of the right airbag portion 11 and the left surface of the left airbag portion 12, further on the rear end of the right airbag portion 11 and the left airbag portion 12 than the seam 18d. With this arrangement, the airbag 10 is flattened along a right-left direction so that the ends of the right airbag portion 11 and the left airbag portion 12 that are further rearward than the folding line $L_1$ are separated from the seam 15. Hereinafter, these extending parts will be referred to as a rear-end extending portion 11a of the right airbag portion 11, and a rear-end extending portion 12a of the left airbag portion 12.

Further, the area of the right surface of the right airbag portion 11 and the area of the left surface of the left airbag portion 12 that are near the center between the folding line $L_1$ and the rear end of the base-end chamber 13 are each pulled along a right-left direction to separate the area near the center of the right airbag portion 11 and the area near the center of the left airbag portion 12, while creating a mountain-fold along the substantially top-bottom folding line $L_3$. Note that this folding line $L_3$ is positioned on the right surface of the right airbag portion 11 and the left surface of the left airbag portion 12, further on the front end of the right airbag portion 11 and the left airbag portion 12 than the seam 18d. At this time, the area of the portion where the surfaces of the right airbag portion 11 and the left airbag portion 12 meet, which surrounds the hollow portion 17 and is between the front end of the seam 15 and the crotch part of the meeting surfaces, is extended and flattened along a right-left direction, as illustrated in FIG. 4. With this arrangement, the ends of the right airbag portion 11 and the left airbag portion 12 that are farther frontward than the folding line $L_1$ are flattened along a right-left direction. Hereinafter, these portions will be referred to as a front-end extending portion 11b of the right airbag portion 11, and a front-end extending portion 12b of the left airbag portion 12.

Furthermore, the base-end chamber 13 is folded along the front surface of the front end extending portions 11b and 12b of the right airbag portion 11 and the left airbag portion 12 At this time, in this embodiment, the base-end chamber 13 is flattened and folded in the substantially top-bottom direction while its left and right surfaces are folded to the inside thereof to form a strip shape, and subsequently this strip-shaped base-end chamber 13 is folded to the front surface of the front-end extending portions 11b and 12b, as illustrated in FIG. 4. At this time, a portion 13b of the strip-shaped base-end chamber 13 that is further rearward than the gas inlet 13a is along a top-bottom direction folded back into a zigzag shape along the front surface of the front-end extending portions 11b and 12b as necessary, as illustrated in FIG. 5B and FIG. 6. With this arrangement, the gas inlet 13a is positioned near the substantial center of the front-end extending portions 11b and 12b along the top-bottom direction. Note that, in this case, the portion 13b of the base-end chamber 13 that is further rearward than the gas inlet 13a is preferably folded back in part to the region that is further upward than the substantial center of the front-end extending portions 11b and 12b along the top-bottom direction.

In a case where slack develops on the front surfaces of the front-end extending portions 11b and 12b when the base-end chamber 13 is thus folded back to the front surfaces of the front-end extending portions 11b and 12b, the areas near the center of the front surfaces of the front-end extending portions 11b and 12b along the top-bottom direction are folded back in a zigzag shape (Z-shape) along substantially right-left folding lines $L_4$ and $L_5$ to form a tuck, as illustrated in FIG. 6. Then, those same areas are partially folded to the inside of the right airbag portion 11 and the left airbag portion 12, thereby removing the slack along the top-bottom direction on the front surfaces of the front end extending portions 11b and 12b. Additionally, the area near the center of the front surfaces of the front-end extending portions 11b and 12b along the right-left direction is valley-folded along a top-bottom folding line $L_6$ to remove the slack along the right-left direction on the front surfaces of the front-end extending portions 11b and 12b. Then, folding is performed from the base toward the left or right onto the front surfaces of the front-end extending portions 11b and 12b. In FIG. 6, this area is folded between the front surfaces of the front-end extending portions 11b and 12b and the folded body of the base-end chamber 13. It should be noted, however, that the treatment of the slack on the front surfaces of the front-end extending portions 11b and 12b is not limited thereto.

Thus folded, the airbag 10 forms the primary folded body 10A that is flattened along the top-bottom direction and the right-left direction.

Secondary Folding Step

In this embodiment, when the primary folded body 10A is to be subjected to the secondary folding process, first the primary folded body 10A is folded in a manner that decreases the width of the right airbag portion 11 and the left airbag portion 12 (the front-end extending portions 11b and 12b and the rear-end extending portions 11a and 12a) along the right-left direction as illustrated in FIG. 7A to FIG. 12B, and subsequently folded in a manner that decreases the width thereof along the top-bottom direction as illustrated in FIG. 13A to FIG. 20A.

Figure 7A:
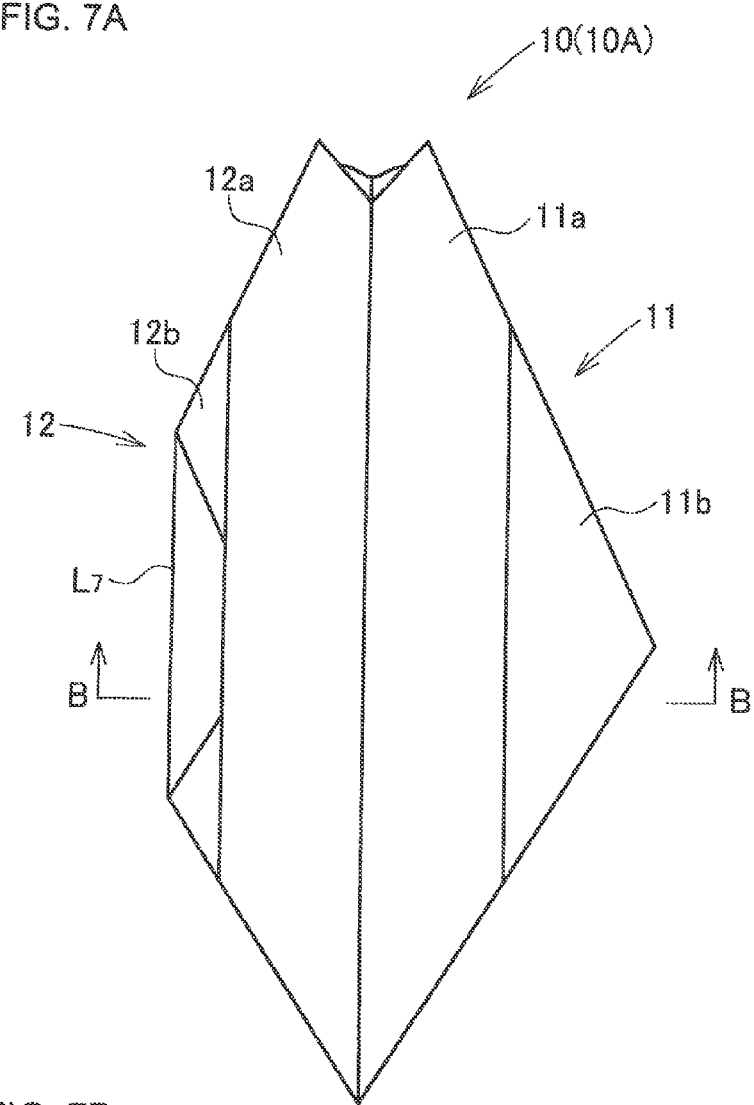
FIG. 7A is a front view illustrating the secondary folding method of the airbag.
Figure 7B:
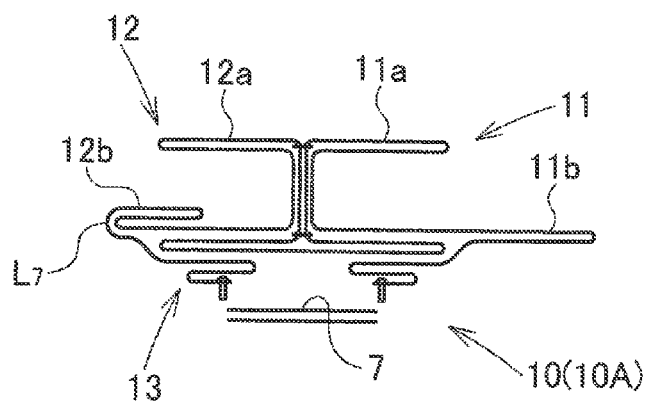
FIG. 7B is a cross-sectional view taken along section B-B in FIG. 7A.
Figure 8A:
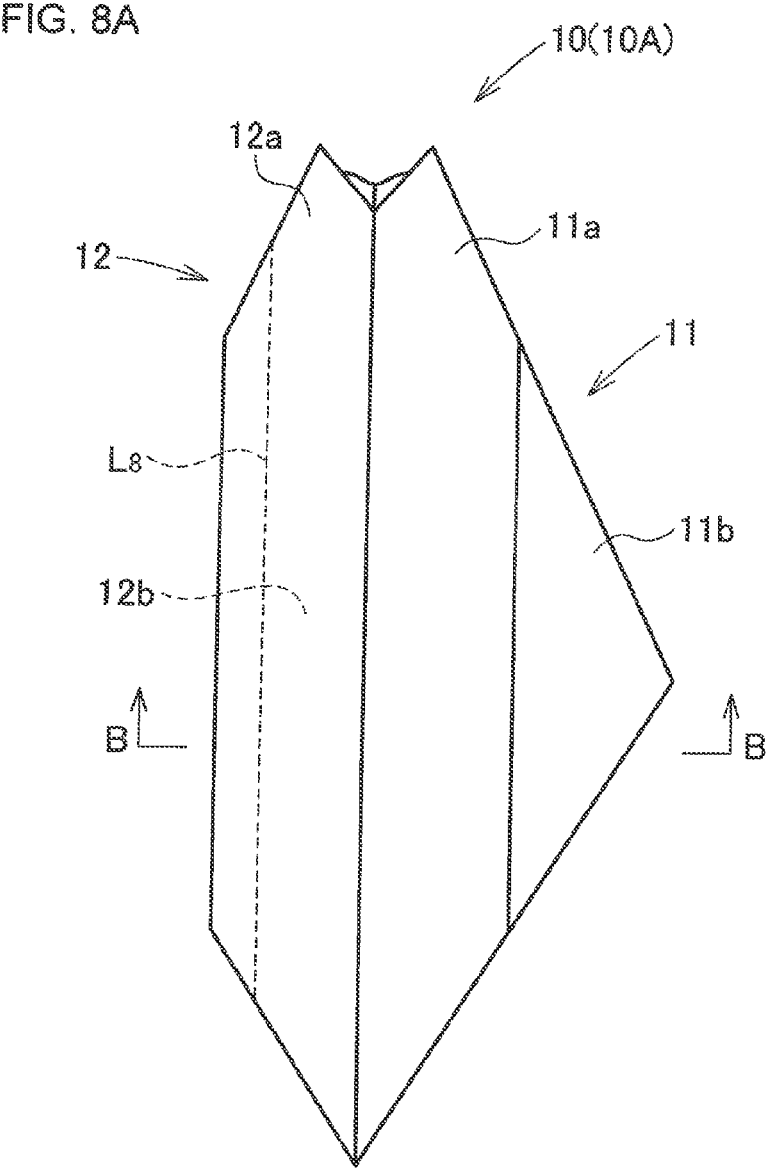
FIG. 8A is a front view illustrating the secondary folding method of the airbag.
Figure 8B:
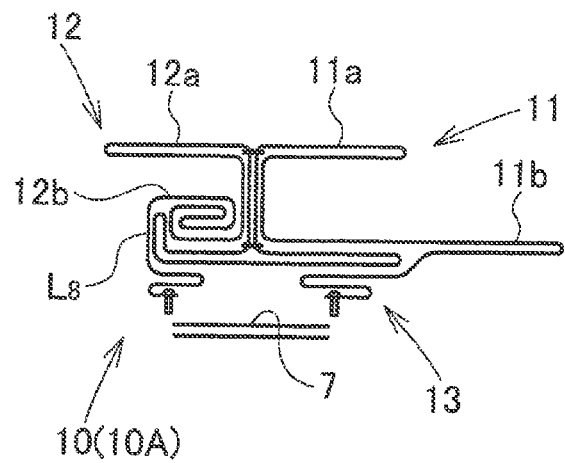
FIG. 8B is a cross-sectional view taken along section B-B in FIG. 8A.

Specifically, as illustrated in FIG. 7A, FIG. 7B, FIG. 8A, and FIG. 8B, first the front-end extending portion 12b of the left airbag portion 12 is folded back toward the center of the primary folded body 10A along the right-left direction along substantially top-bottom folding lines $L_7$ and $L_8$ from the left end at a predetermined width, forming a roll-shaped folded body. Note that while the front-end extending portion 12b is folded back twice in FIG. 7A, FIG. 7B, FIG. 8A, and FIG. 8B, the front-end extending portion 12b may be folded once or three or more times. In such a case, as illustrated in FIG. 7B, and FIG. 8B, the front-end extending portion 12b is folded back toward the rear surface thereof, and this roll-shaped folded body of the front-end extending portion 12b is positioned between the folded body of the base-end chamber 13 and the rear-end extending portion 12a.

Figure 9A:
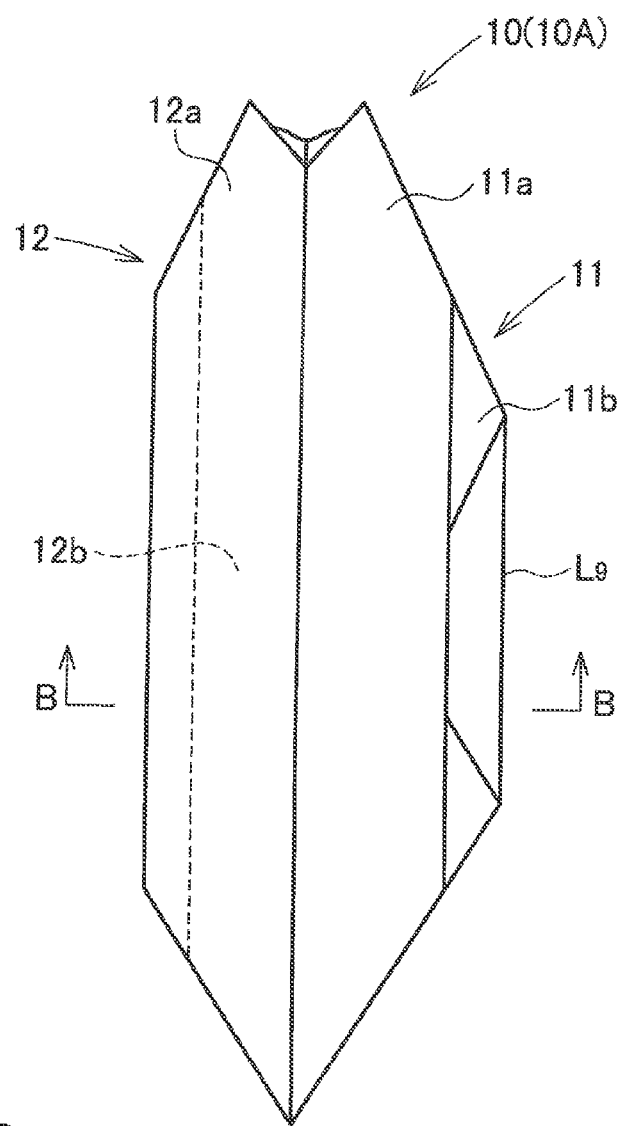
FIG. 9A is a front view illustrating the secondary folding method of the airbag.
Figure 9B:
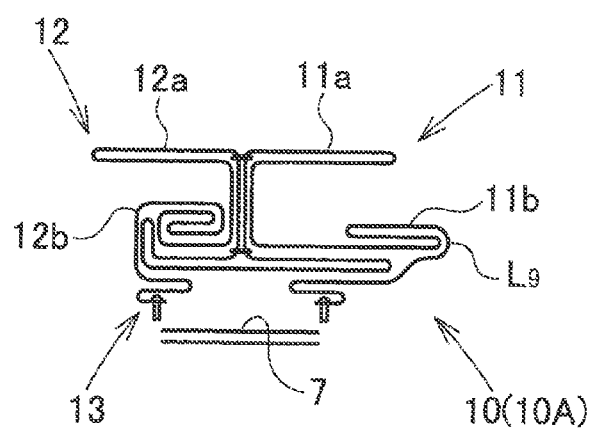
FIG. 9B is a cross-sectional view taken along section B-B in FIG. 9A.
Figure 10A:
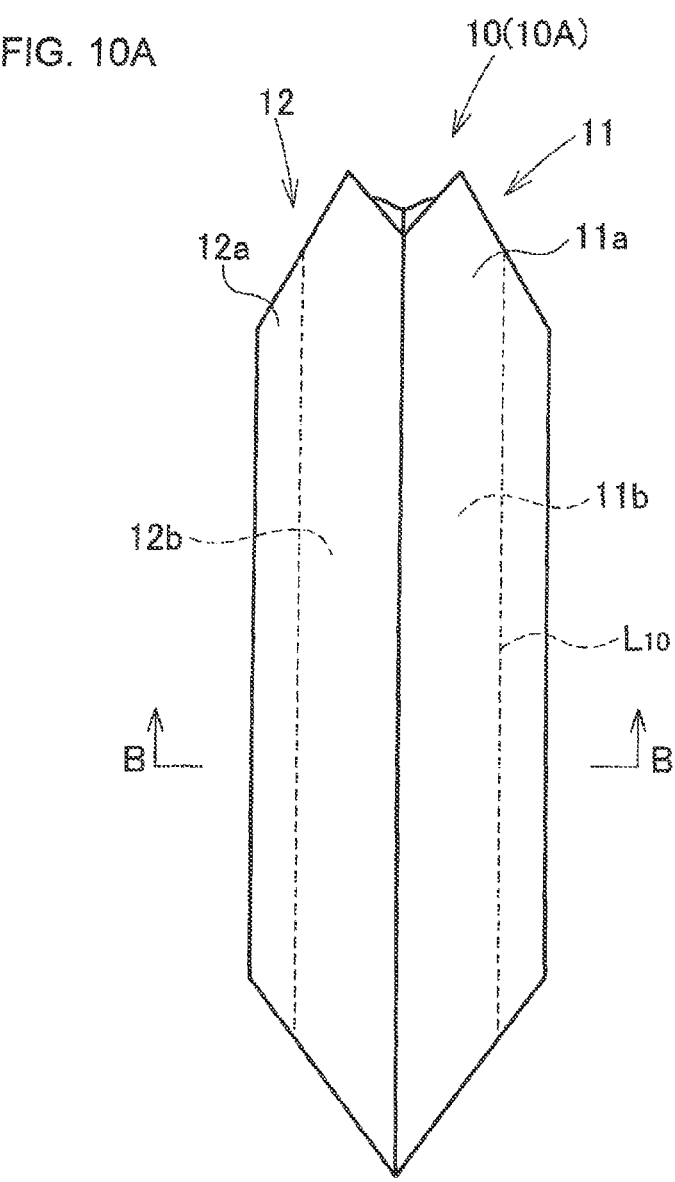
FIG. 10A is a front view illustrating the secondary folding method of the airbag.
Figure 10B:
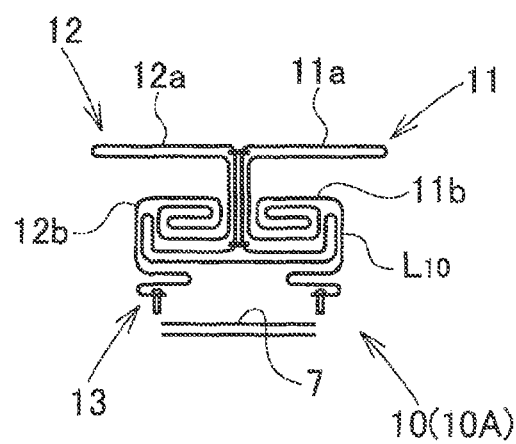
FIG. 10B is a cross-sectional view taken along section B-B in FIG. 10A.

Next, as illustrated in FIG. 9A, FIG. 9B, FIG. 10A, and FIG. 10B, the front-end extending portion 11b of the right airbag portion 11 is folded in the same manner as the front-end extending portion 12b of the left airbag portion 12. That is, the front-end extending portion 11b of the right airbag portion 11 is folded back toward the center of the primary folded body 10A along the right-left direction along substantially top-bottom folding lines $L_9$ and $L_{10}$ from the right end thereof at a predetermined width, forming a roll-shaped folded body. Note that while the front-end extending portion 11b is folded twice in FIG. 9A, FIG. 9B, FIG. 10A, and FIG. 10B, the front-end extending portion 11b may be folded once or three or more times. In such a case, as illustrated in FIG. 9B, and FIG. 10B, the front-end extending portion 11b is folded back toward the rear surface thereof, and this roll-shaped folded body of the front-end extending portion 11b is positioned between the folded body of the base-end chamber 13 and the rear-end extending portion 11a.

It should be noted, however, that the order in which the front-end extending portions 11b and 12b are folded is not limited thereto. For example, first the front-end extending portion 11b of the right airbag portion 11 may be folded into a roll-shape and then the front-end extending portion 12b of the left airbag portion 12 may be folded into a roll-shape.

Figure 11A:
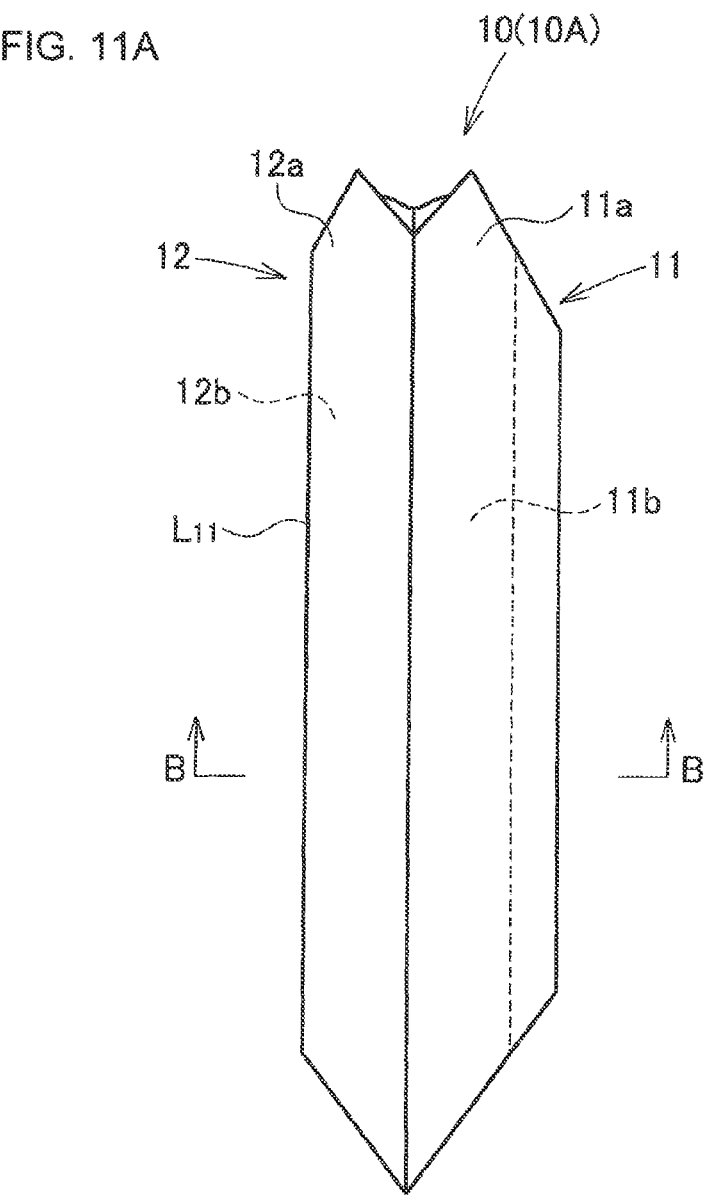
FIG. 11A is a front view illustrating the secondary folding method of the airbag.
Figure 11B:
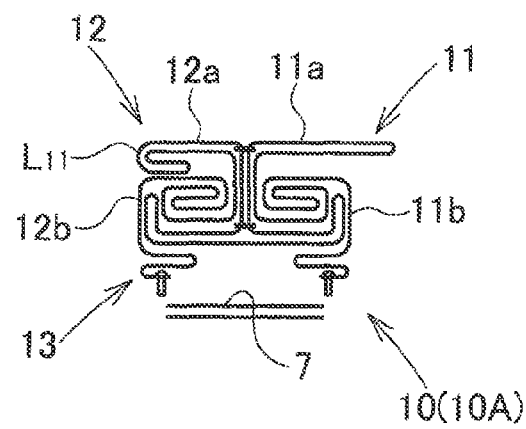
FIG. 11B is a cross-sectional view taken along section B-B in FIG. 11A.

Next, as illustrated in FIG. 11A and FIG. 11B, the left end of the rear-end extending portion 12a of the left airbag portion 12 is folded back toward the center of the primary folded body 10A along the right-left direction along a substantially top-bottom folding line $L_{11}$, up to the part of the front-end extending portion 12b that sticks out further leftward than the roll-shaped folded body. Note, however, that while the left end of the rear-end extending portion 12a is folded back only once, the left end may be folded back twice or more times. In such a case, as illustrated in FIG. 11B, the left end of the rear-end extending portion 12a is folded back to the front surface thereof, and positioned between the roll-shaped folded body of the front-end extending portion 12b and the part of the rear-end extending portion 12a that is further toward the right end than the folding line $L_{11}$.

Figure 12A:
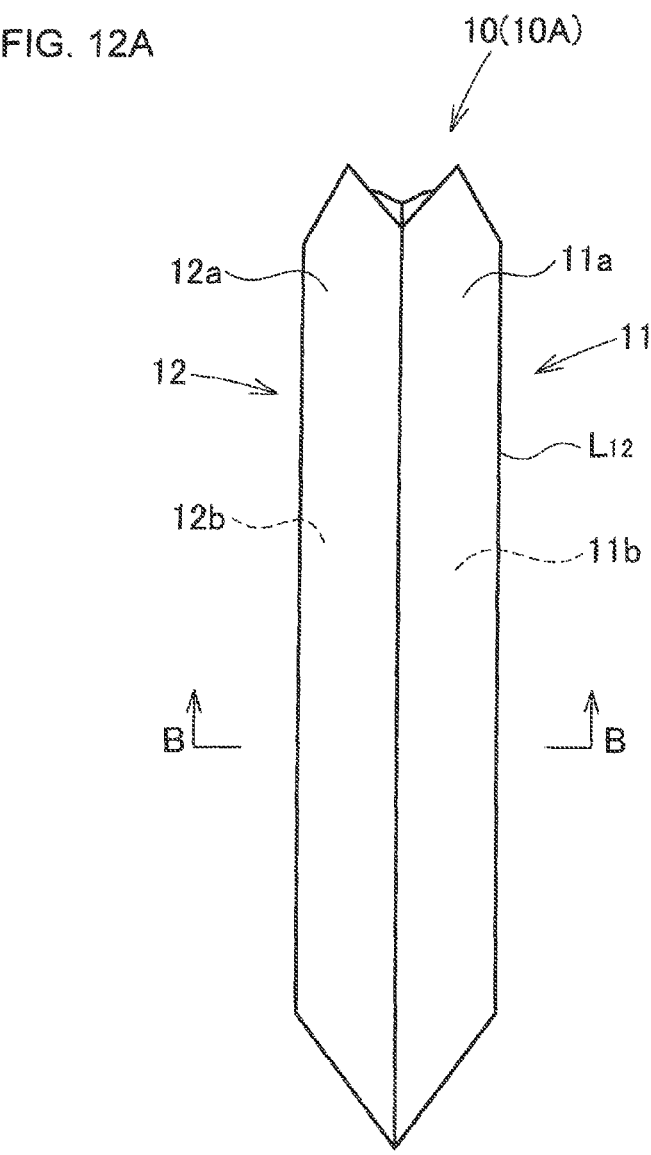
FIG. 12A is a front view illustrating the secondary folding method of the airbag.
Figure 12B:
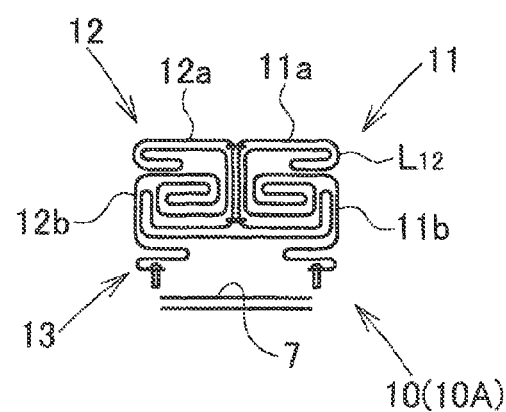
FIG. 12B is a cross-sectional view taken along section B-B in FIG. 12A.
Figure 13A:
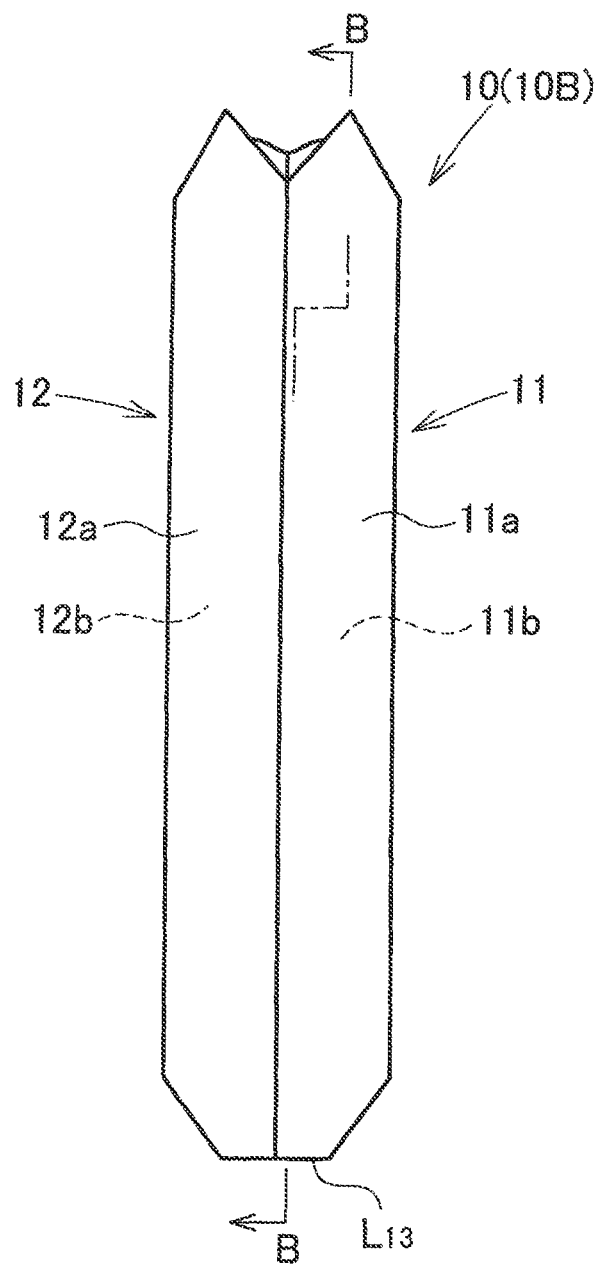
FIG. 13A is a front view illustrating the secondary folding method of the airbag.
Figure 13B:
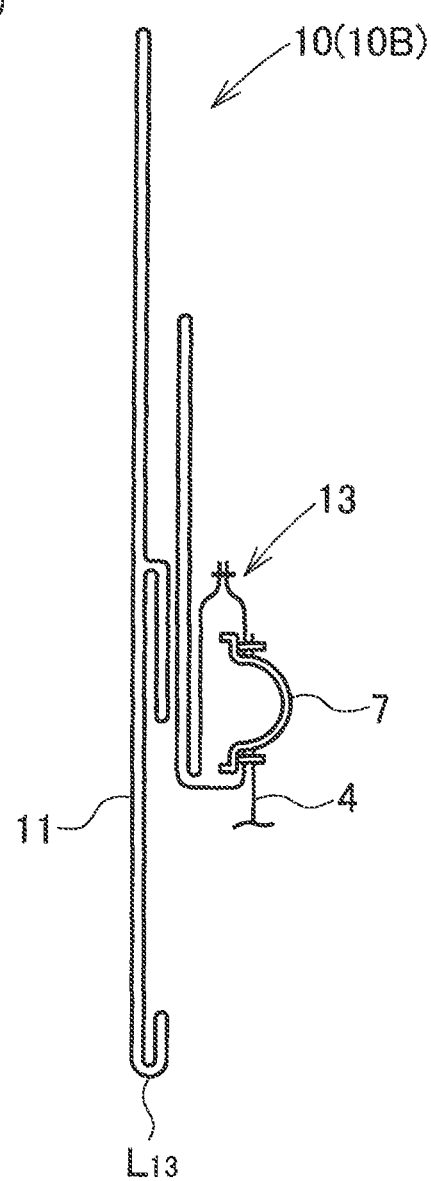
FIG. 13B is a cross-sectional view taken along section B-B in FIG. 13A.
Figure 14:
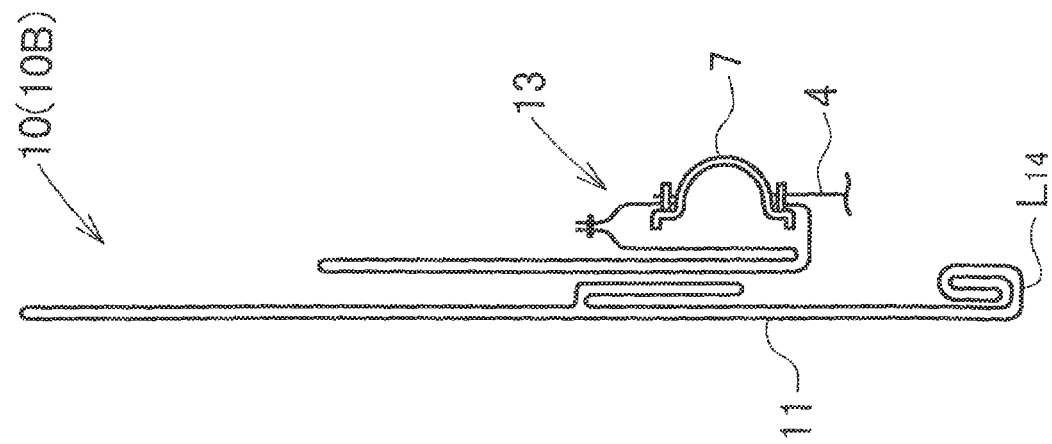
FIG. 14 is a cross-sectional view of the same section as FIG. 13B, illustrating the secondary folding method of the airbag.
Figure 15:
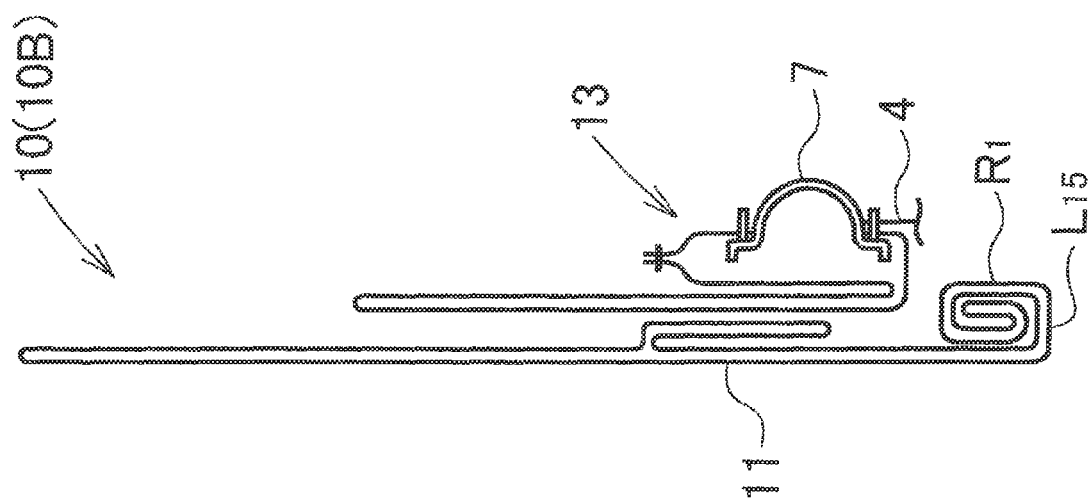
FIG. 15 is a cross-sectional view of the same section as FIG. 13B, illustrating the secondary folding method of the airbag.

Next, as illustrated in FIG. 12A and FIG. 12B, the rear-end extending portion 11a of the right airbag portion 11 is folded in the same manner as the rear-end extending portion 12a of the left airbag portion 12. That is, the right end of the rear-end extending portion 11a of the right airbag portion 11 is folded back toward the center of the primary folded body 10A along the right-left direction along a substantially top-bottom folding line $L_{12}$, up to the part of the front-end extending portion 11b that sticks out further rightward than the roll-shaped body. Note, however, that while the right end of the rear-end extending portion 11a is folded back only once, the right end may be folded back twice or more times. In such a case, as illustrated in FIG. 12B, the right end of the rear-end extending portion 11a is folded back to the front surface thereof, and positioned between the roll-shaped folded body of the front-end extending portion 11b and the part of the rear-end extending portion 11a that is further toward the left end than the folding line $L_{12}$.

It should be noted, however, that the order in which the rear-end extending portions 11a and 12a are folded is not limited thereto. For example, first the rear-end extending portion 11a of the right airbag portion 11 may be folded and then the rear-end extending portion 12a of the left airbag portion 12 may be folded.

With this arrangement, the top-bottom folding of the primary folded body 10A is completed, and the airbag 10 is formed into along a top-bottom direction long and narrow strip-shaped intermediate folded body 10B.

Next, as illustrated in FIG. 13A to FIG. 15, the strip-shaped intermediate folded body 10B is folded back to the front surface along substantially right-left folding lines $L_{13}$, $L^{14}$, and $L_{15}$ from the lower end thereof to the height of the area near the lower edge of the press plate 7, at a predetermined width, to form a roll-shaped folded body $R_1$. Note that, while the lower end of the intermediate folded body 10B is folded back three times in FIG. 13A to FIG. 15, the lower end may be folded back once or four or more times.

Figure 16:
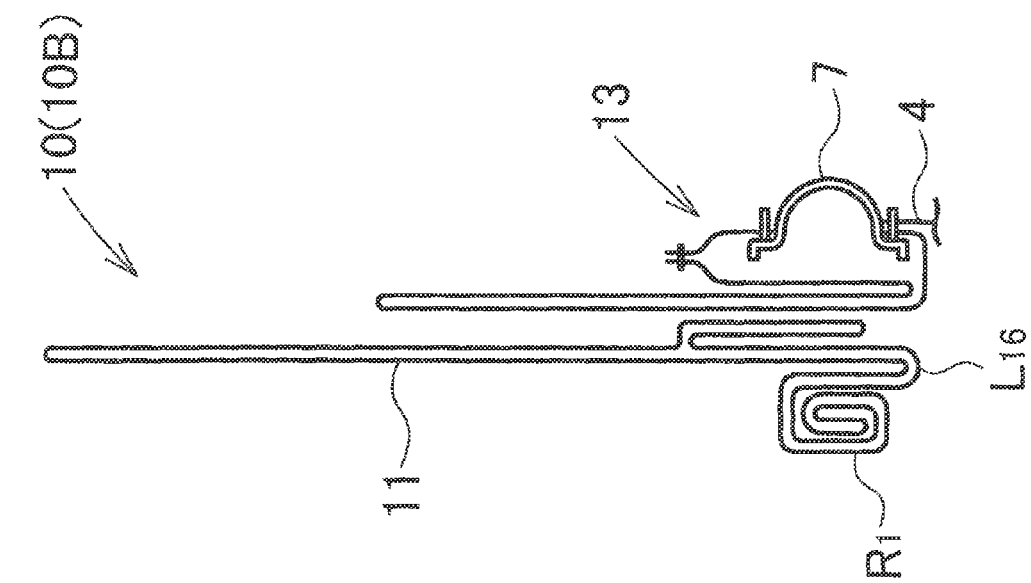
FIG. 16 is a cross-sectional view of the same section as FIG. 13B, illustrating the secondary folding method of the airbag.

Next, as illustrated in FIG. 16, the lower end of the intermediate folded body 10B is folded back to the rear surface along a substantially right-left folding line $L_{16}$ at the height near the lower edge of the press plate 7, and the roll-shaped folded body $R_1$ is positioned on the rear surface near the center of the intermediate folded body 10B along the top-bottom direction.

Figure 17:
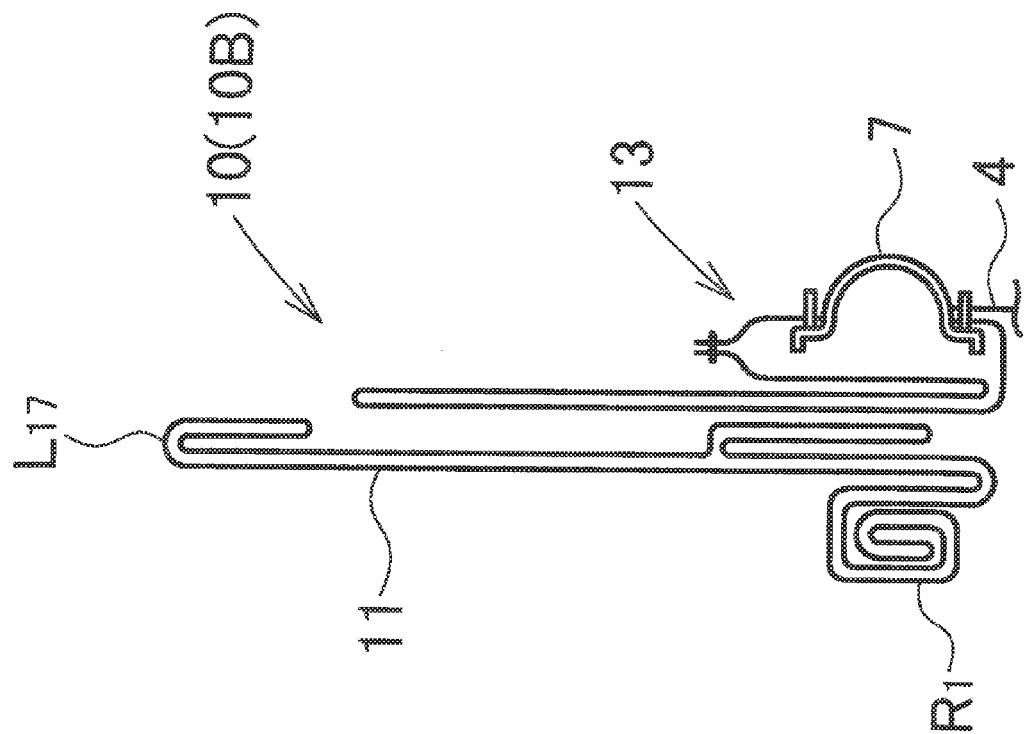
FIG. 17 is a cross-sectional view of the same section as FIG. 13B, illustrating the secondary folding method of the airbag.
Figure 18:
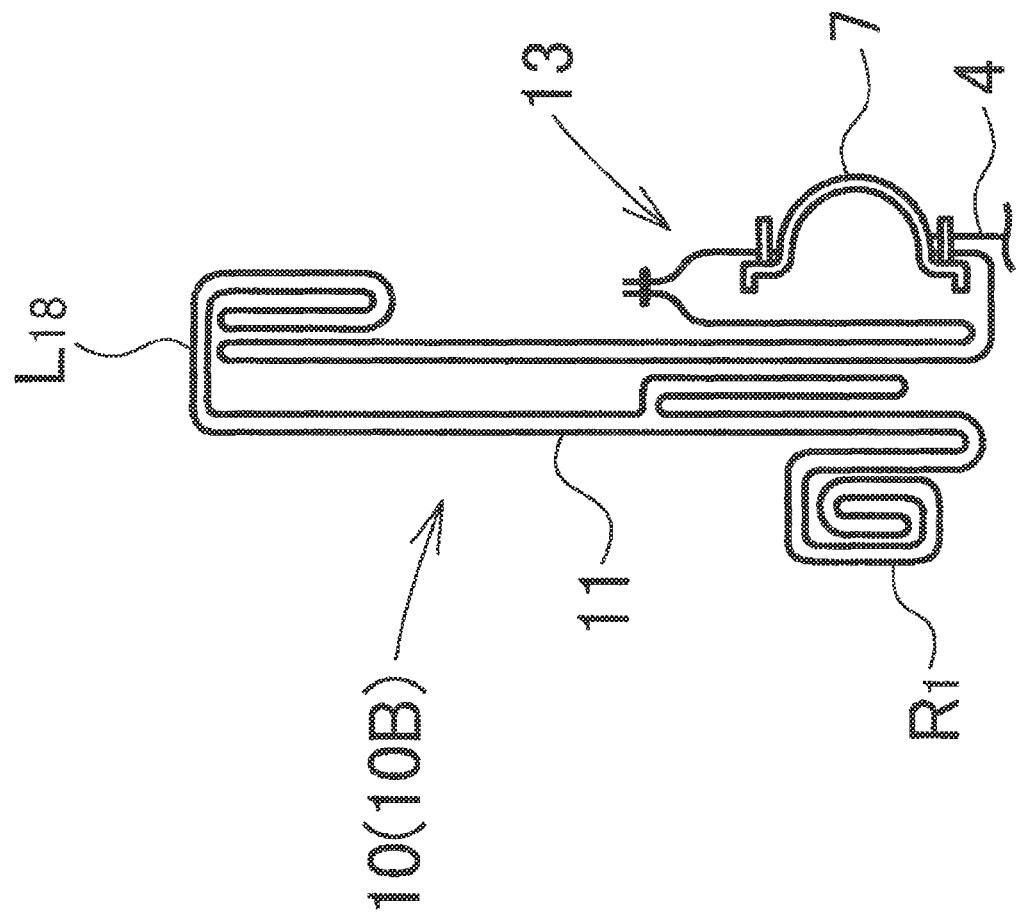
FIG. 18 is a cross-sectional view of the same section as FIG. 13B, illustrating the secondary folding method of the airbag.
Figure 19:
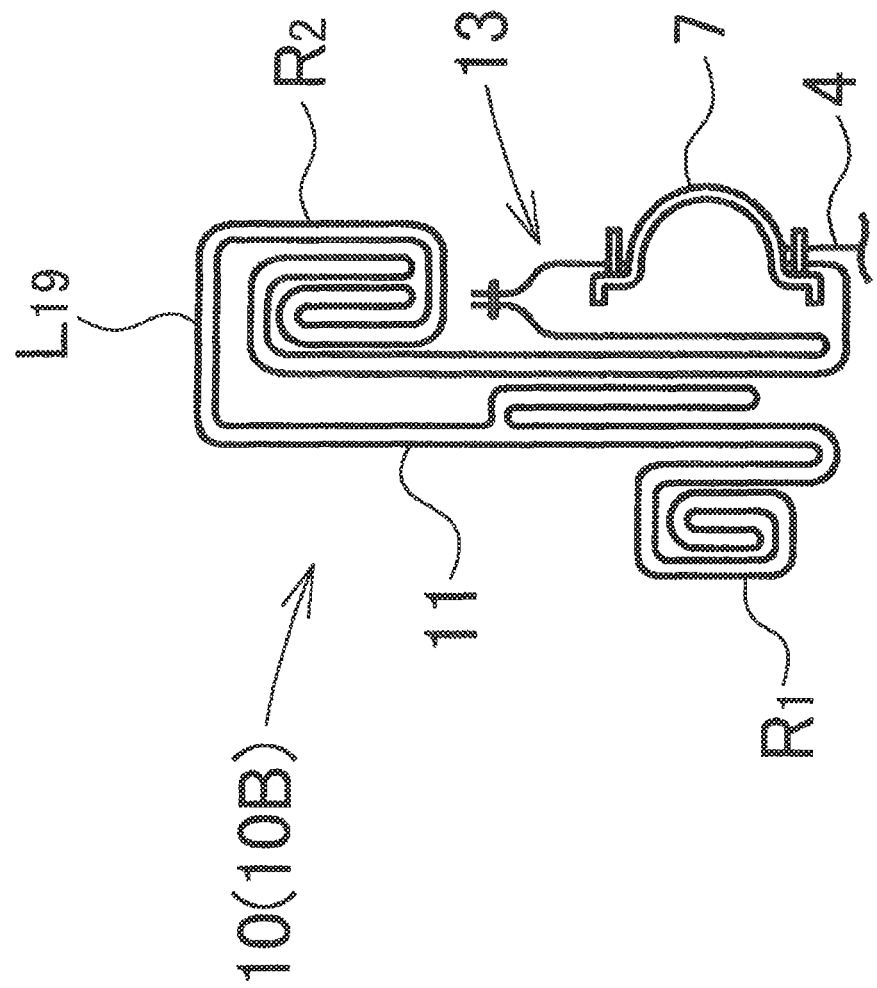
FIG. 19 is a cross-sectional view of the same section as FIG. 13B, illustrating the secondary folding method of the airbag.

Next, as illustrated in FIG. 17 to FIG. 19, the intermediate folded body 10B is folded back to the front surface along substantially right-left folding lines $L_{17}$, $L_{18}$, and $L_{19}$ from the upper end thereof to the height of the area near the upper edge of the press plate 7, at a predetermined width, to form a roll-shaped folded body $R_2$. Note that, while the upper end of the intermediate folded body 10B is folded back three times in FIG. 17 to FIG. 19, the upper end may be folded back once or four or more times.

Figure 20:
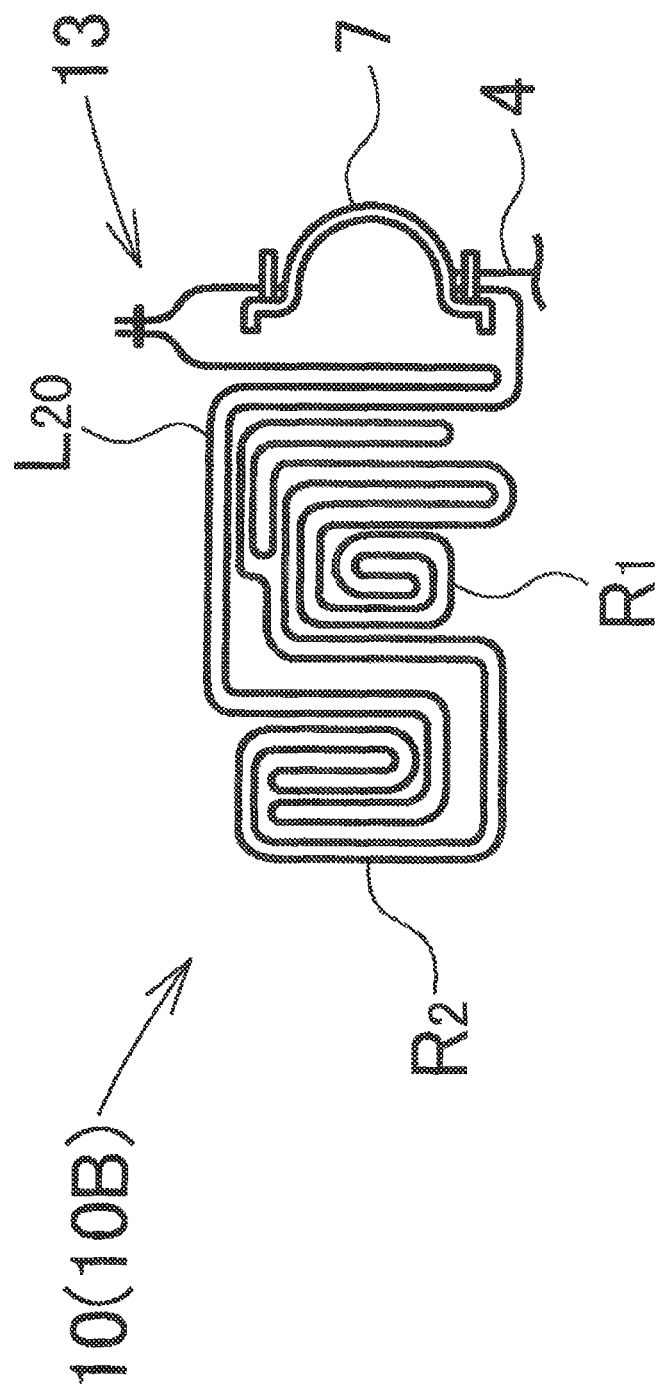
FIG. 20 is a cross-sectional view of the same section as FIG. 13B, illustrating the secondary folding method of the airbag.

Next, as illustrated in FIG. 20, the upper end of the intermediate folded body 10B is folded back to the rear surface along a substantially right-left folding line $L_{20}$ at the height near the upper edge of the press plate 7, and the roll-shaped folded body $R_2$ of this upper end is positioned further toward the rear surface of the previously folded roll-shaped folded body R) of the lower end.

Figure 21:
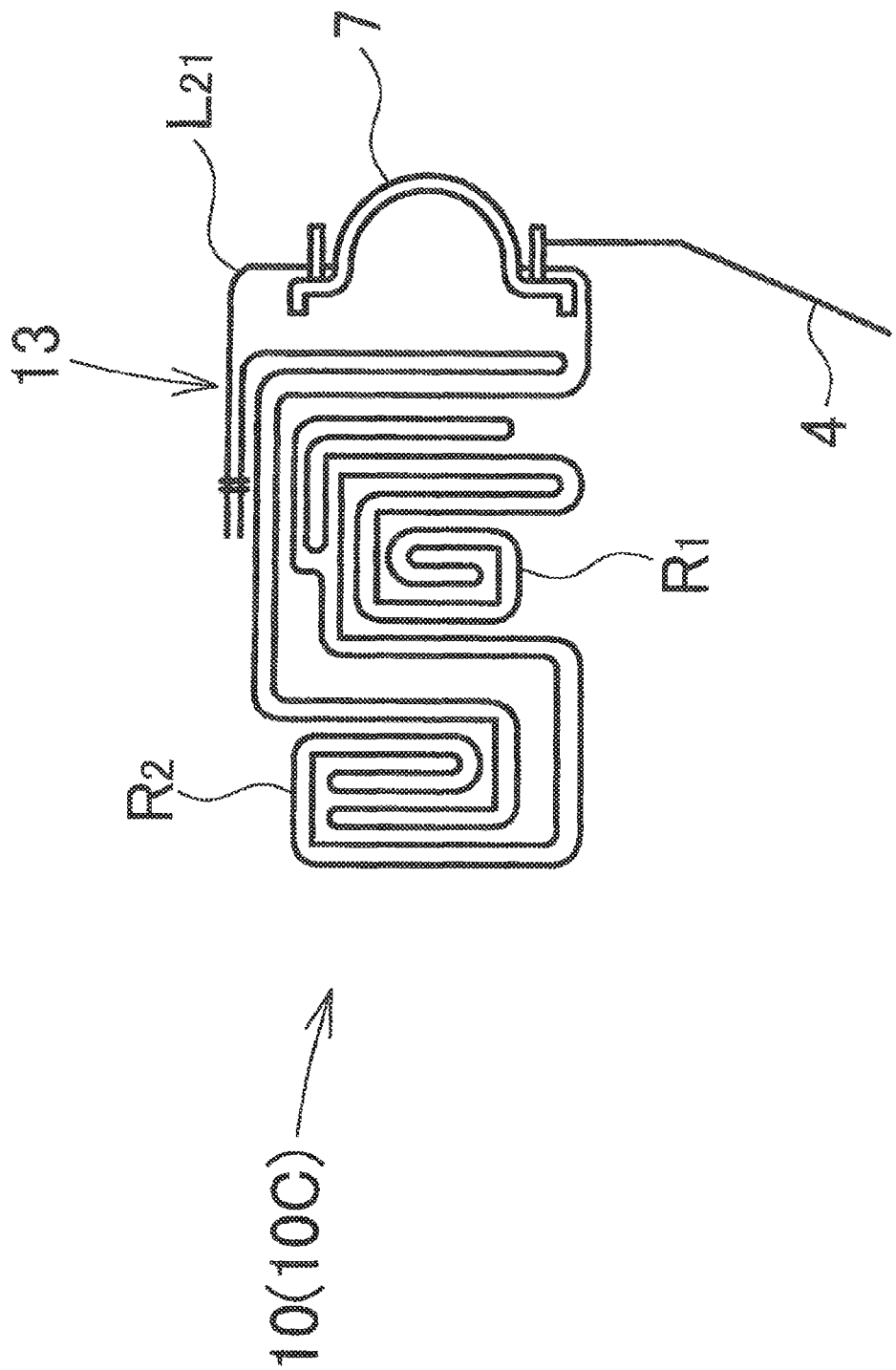
FIG. 21 is a cross-sectional view of the same section as FIG. 13B, illustrating the secondary folding method of the airbag.

Next, as illustrated in FIG. 21, the part of the base-end chamber 13 that is further toward the front end than the press plate 7 (the front-end portion when the airbag 10 is inflated; the end that is further upward than the upper edge of the press plate 7 of the intermediate folded body 10B in FIG. 20) is folded rearward along a substantially right-left folding line $L_{21}$ near the upper edge of the press plate 7, onto the upper surface of the roll-shaped folded body $R_1$.

Thus subjected to the secondary folding process, the airbag 10 forms the block-shaped final folded body 10C, as illustrated in FIG. 21.

Subsequently, as illustrated in FIG. 21 and FIG. 22, the shape-holding sheet 4 is wrapped around the airbag final folded body 10C, and the end thereof is attached to the stud bolts 7a. With this arrangement, the shape of the airbag final folded body 10C is held by the shape-holding sheet 4.

This folded body 10C of the airbag 10 is sent to the airbag device assembly process. In the airbag device assembly process, the inflator holding portion 7b of the press plate 7 is installed to the inflator 3, the inflator 3 and the folded body 10C of the airbag 10 are positioned inside the retainer 2, and the press plate 7 is connected to the bottom surface of the retainer 2 by the stud bolts 7a, thereby completing the passenger seat airbag device. Note that, as described above, a lid (not shown) is mounted to the upper opening of the retainer 2 as necessary.

The folded body 10C of the airbag 10, as illustrated in FIG. 22, is disposed inside the retainer 2 with the base-end chamber 13 downward and the end of the base-end chamber 13 that is further toward the front end than the press plate 7 placed on the vehicle front side of the roll-shaped folded body $R_1$ on the lower end of the right airbag portion 11 and the left airbag portion 12. With this arrangement, the roll-shaped folded body $R_2$ on the upper end of the right airbag portion 11 and the left airbag portion 12 is disposed above the roll-shaped folded body $R_1$ on the lower end, inside the retainer 2.

The operation of the passenger seat airbag device comprising this airbag 10 will now be described.

When a vehicle equipped with this airbag device is involved in a collision, the inflator 3 ejects gas. The gas from the inflator 3 is first introduced into the base-end chamber 13, inflating the base-end chamber 13. The inflation pressure of the airbag 10 breaks the shape-holding sheet 4, causing the door portion (or lid) of the instrument panel 1 to break open and form an opening for the emerging airbag. The airbag 10 then inflates through this opening and into the vehicle interior.

The gas introduced into the base-chamber 13 subsequently flows inside the right airbag portion 11 and the left airbag portion 12. With this arrangement, the right airbag portion 11 inflates on the front right side of the occupant, and the left airbag portion 12 inflates on the front left side of the occupant. The inflated right airbag portion 11 receives the right side of the thorax of the occupant, and the inflated left airbag portion 12 receives the left side of the thorax of the occupant, with the breastbone region facing the recessed portion 16 therebetween. As a result, the reaction force applied near the breastbones during airbag reception decreases. Additionally, the head portion of the occupant enters and is received by the recessed portion 16.

According to the folding method of an airbag of the present invention, as described above, the airbag 10 is first folded in a manner that decreases the thickness of the right airbag portion 11 and the left airbag portion 12 in the substantially front-back direction, and at least partially separates the right surface of the right airbag portion 11 and the left surface of the left airbag portion 12 along a right-left direction, thereby forming the primary folded body 10A that is flattened along the top-bottom direction and the right-left direction. Subsequently, the primary folded body 10A is folded in a manner that decreases its width along the right-left direction, thereby forming the along a top-bottom direction long and narrow strip-shaped intermediate folded body 10B. Subsequently, this intermediate folded body 10B is folded in a manner that decreases its width along the top-bottom direction, thereby forming the final folded body 10C. As a result, when the airbag 10 begins to inflate, the airbag 10 deploys in a manner that unfolds and deploys the top-bottom folds along a top-bottom direction, subsequently unfolds and deploys the right-left folds along a right-left direction, and subsequently increases the thickness in the front-back direction. With this arrangement, once inflation begins, the airbag 10 can be deployed across a wide range along the top-bottom direction and the right-left direction in a short period of time. As a result, in a case where the airbag 10 starts inflating with the occupant seated relatively forward causing the occupant to contact the airbag 10 in the early stages while the airbag 10 is being inflated, as illustrated in FIG. 23A and FIG. 23B, for example, the airbag 10 receives the shoulders and thorax portion of the occupant across a wide range. With this arrangement, when the occupant contacts the airbag 10 during inflation, the load locally applied to the head and neck regions of the occupant is suppressed. Note that the chain double-dashed lines in FIG. 23A and FIG. 23B denote a silhouette of the airbag 10 when it is fully inflated.

According to this embodiment, in the secondary folding step, the upper end, lower end, left end, and right end of the primary folded body 10A are each folded toward the center of the primary folded body 10A along the top-bottom direction and the right-left direction. With this arrangement, at the time of inflation, the airbag 10 inflates quickly and substantially evenly vertically and horizontally.

According to this embodiment, in the secondary folding step, the upper end, lower end, left end, and right end of the primary folded body 10A of the airbag 10 are each folded into a roll shape toward the center of the primary folded body 10A along the top-bottom direction and the right-left direction. As a result, when the airbag 10 inflates, the upper end and lower end roll upward and downward, respectively, inflating and deploying while unrolling, and the left end and right end roll leftward and rightward, respectively, inflating and deploying while unrolling. When each of the upper, lower, left, and right ends of the rolled airbag 10 inflates, the end inflates starting from the unrolled portion, causing these portions to inflate substantially evenly in the axial direction and substantially parallel direction of the roll-shaped fold. That is, in this embodiment, the upper and lower ends of the primary folded body 10A inflate substantially equally in the horizontal direction, and the left and right ends of the primary folded body 10A inflate substantially equally in the vertical direction.

According to this embodiment, in the secondary folding step, the primary folded body 10A is folded in a manner that decreases its width along the right-left direction, thereby forming the intermediate folded body 10B, and then the intermediate folded body 10B is folded in a manner that decreases its width along the top-bottom direction. With this arrangement, once inflation begins, the airbag 10 inflates quickly in the vertical direction.

Further, according to this embodiment, the lower end and the upper end of the intermediate folded body 10B are each folded into a roll, and the roll-shaped folded body $R_2$ of the upper end is disposed upward from the roll-shaped folded body $R_1$ of the lower end. As a result, when the airbag 10 begins to inflate, the roll-shaped folded body $R_2$ of the upper end of the airbag 10 is pressed from the retainer 2 into the vehicle interior before the roll-shaped folded body $R_1$ of the lower end, making the upper end of the airbag 10 inflate and deploy more quickly than the lower end. With this arrangement, the airbag 10 is capable of deploying in front of the head portion and thorax portion of the occupant in a short period of time. Additionally, with this arrangement, even if the object C is present in the vicinity of the instrument panel 1 as illustrated in FIG. 24A, for example, the airbag 10 inflates and deploys toward the vehicle rear, passing over the object C. As a result, the invention keeps the inflating airbag 10 from excessively pressing the object C located in the vicinity of the instrument panel 1 toward the rear. Subsequently, as illustrated in FIG. 24B, the lower end of the airbag 10 inflates, causing the object C to be engulfed in the hollow portion 17 and to be restrained by the airbag 10. At this time, the airbag 10 inflates downward covering the object C from above, thereby engulfing the object C in the hollow portion 17.

According to this embodiment, the airbag 10 is provided with the connecting bands 18 at the intermediate part of the right airbag portion 11 in the front-back direction at the time of inflation, that connect the left and right surfaces of the right airbag portion 11. Additionally, the airbag 10 is provided with the connecting bands 18 at the intermediate part of the left airbag portion 12 in the front-back direction at the time of inflation, that connect the left and right surfaces of the left airbag portion 12. In the primary folding step, the part of the right surface of the right airbag portion 11 that is positioned further toward the rear end of the right airbag portion 11 and the left airbag portion 12 than the connecting bands 18, and the part of the left surface of the left airbag portion 12 that is positioned further toward the rear end of the right airbag portion 11 and the left airbag portion 12 than the connecting bands 18 are along a right-left direction separated. Further, the part of the right surface of the right airbag portion 11 that is positioned further toward the front end of the right airbag portion 11 and the left airbag portion 12 than the connecting bands 18, and the part of the left surface of the left airbag portion 12 that is positioned further toward the front end than the right airbag portion 11 and the left airbag portion 12 than the connecting bands 18 are along a right-left direction separated. With this arrangement, the airbag 10 is extended along a right-left direction. By folding the airbag 10 is this manner, the airbag 10 can be sufficiently extended along a right-left direction, even if the airbag 10 is provided with connecting bands 18 that connect the left and right surfaces of the right airbag portion 11 and the left and right surfaces of the left airbag portion 12.

According to this embodiment, in the secondary folding step, the part of the right airbag portion 11 that is further toward the rear end than the connecting bands 18 and the part of the left airbag portion 12 that is further toward the rear end than the connecting bands 18 (that is, the rear-end extending portion 11a and the rear-end extending portion 12a) are folded toward the center of the primary folded body 10A along the right-left direction, Additionally, the part of the right airbag portion 11 that is further toward the front end than the connecting bands 18 and the part of the left airbag portion 12 that is further toward the front end than the connecting bands 18 (that is, the front-end extending portion 11b and the front-end extending portion 12b) are folded toward the center of the primary folded body 10A along the right-left direction. When the airbag 10 is thus folded, at the time of inflation, the rear-end extending portion 11a of the right airbag portion 11 and the rear-end extending portion 12a of the left airbag portion 12, and the front-end extending portion 11b of the right airbag portion 11 and the front-end extending portion 12b of the left airbag portion 12 respectively deploy along a right-left direction. As a result, quick deployment of the airbag 10 in the horizontal direction is achieved. Additionally, along with the horizontal deployment of the rear-end extending portions 11a and 12a and the front-end extending portions 11b and 12b, the rear-end extending portions 11a and 12a and the front-end extending portions 11b and 12b inflate, increasing the respective thicknesses in the front-back direction. As a result, quick deployment of the airbag 10 in the front-back direction is also achieved.

While the invention has been explained with reference to the specific embodiments of the invention, the explanation is illustrative and the invention may be practiced in various other forms.

For example, while in the above embodiment the upper end, lower end, left end, and right end of the primary folded body 10A of the airbag 10 are all folded into a roll-shape, at least a part of these may be folded into an accordion-shape.

What is claimed is:

1. A folding method of an airbag comprising a base end chamber in which an inflator is disposed, a left airbag portion opening to the base end chamber for receiving inflation gas from the inflator therein to inflate on the left side in front of an occupant, and a right airbag portion opening to the base end chamber for receiving inflation gas from the inflator therein to inflate on the right side in front of an occupant, comprising the steps of:
   a primary folding step for forming a primary folded body in which said airbag is substantially flattened along a top-bottom direction and along a right-left direction by folding said airbag in a manner that decreases a thickness of said left airbag portion and said right airbag portion along a substantially front-back direction and at least partially separates a left surface of said left airbag portion and a right surface of said right airbag portion along the right-left direction; and
   a secondary folding step for forming a final folded body by folding said primary folded body in a manner that decreases its width substantially along the top-bottom direction and along the right-left direction, wherein
   in said secondary folding step,
   an upper end portion, a lower end portion, a left end portion, and a right end portion of said primary folded body are each folded toward a center of said primary folded body along the top-bottom direction and along the right-left direction, at least one of an upper end portion, a lower end portion, a left end portion, and a right end portion of said primary folded body is folded toward a center of said primary folded body into a roll shape along the top-bottom direction and along the right-left direction, said primary folded body is folded in a manner that decreases its width along the right-left direction, and subsequently folded in a manner that decreases its width along the top-bottom direction, and wherein said airbag inflates from an instrument panel of a vehicle toward the vehicle rear, bringing said airbag close to an occupant, and further comprises a rearward connection between a right surface of the left airbag portion and a left surface of the right airbag portion rearwardly of the base end chamber that extends in the top-bottom direction for the majority of the width of the inflated left and right airbag portions in the top-bottom direction to form a hollow portion disposed between said left airbag portion and said right airbag portion rearwardly of the base end chamber and forwardly of the rearward connection, that passes substantially vertically through an area surrounded by said airbag when said airbag is in an inflated state; and at least a part of said hollow portion is positioned further toward the vehicle rear than an end portion of the instrument panel on the vehicle rear side when said airbag is in an inflated state.

2. The folding method of an airbag according to claim 1, wherein:

said airbag further comprises connecting members including a connecting member that is provided at a intermediate part of said left airbag portion along the front-back direction at the time of inflation and connects the left and right surfaces of said left airbag portion, and another connecting member that is provided at a intermediate part of said right airbag portion along the front-back direction at the time of inflation and connects the left and right surfaces of said right airbag portion; and in said secondary folding step, an end portion of said left airbag portion that is further rearward than said connecting members and an end portion of said right airbag portion that is further rearward than said connecting members are folded toward a center of said primary folded body along the right-left direction, and an end portion of said left airbag portion that is further frontward than said connecting members and an end portion of said right airbag portion that is further forward frontward than said connecting members are folded toward a center of said primary folded body along the right-left direction.

3. The folding method of an airbag according to claim 2 wherein the rearward connection comprises a closed-loop seam between the left airbag portion right surface and the right airbag portion left surface that extends in the top-bottom direction and in the front-back direction about the location at which the connecting members are connected to the left airbag portion right surface and the right airbag portion left surface.

4. A folding method of an airbag comprising a base end chamber in which an inflator is disposed, a left airbag portion opening to the base end chamber for receiving inflation gas from the inflator therein to inflate on the left side in front of an occupant, and a right airbag portion opening to the base end chamber for receiving inflation gas from the inflator therein to inflate on the right side in front of an occupant, comprising the steps of:

a primary folding step for forming a primary folded body in which said airbag is substantially flattened along a top-bottom direction and along a right-left direction by folding said airbag in a manner that decreases a thickness of said left airbag portion and said right airbag portion along a substantially front-back direction and at least partially separates a left surface of said left airbag portion and a right surface of said right airbag portion along the right-left direction; and a secondary folding step for forming a final folded body by folding said primary folded body in a manner that decreases its width substantially along the top-bottom direction and along the right-left direction wherein in said secondary folding step, an upper end portion, a lower end portion, a left end portion, and a right end portion of said primary folded body are each folded toward a center of said primary folded body along the top-bottom direction and along the right-left direction, at least one of an upper end portion, a lower end portion, a left end portion, and a right end portion of said primary folded body is folded toward a center of said primary folded body into a roll shape along the top-bottom direction and along the right-left direction, said primary folded body is folded in a manner that decreases its width along the right-left direction, and subsequently folded in a manner that decreases its width along the top-bottom direction, and wherein said airbag inflates from an instrument panel of a vehicle toward the vehicle rear, bringing said airbag close to an occupant, and further comprises a rearward connection between a right surface of the left airbag portion and a left surface of the right airbag portion rearwardly of the base end chamber that extends in the top-bottom direction for the majority of the width of the inflated left and right airbag portions in the top-bottom direction to form a hollow portion disposed between said left airbag portion and said right airbag portion rearwardly of the base end chamber and forwardly of the rearward connection, that passes substantially vertically through an area surrounded by said airbag when said airbag is in an inflated state; and at least a part of said hollow portion is positioned further toward the vehicle rear than an end portion of the instrument panel on the vehicle rear side when said airbag is in an inflated state, said airbag further comprises connecting members including a connecting member that is provided at a intermediate part of said left airbag portion along the front-back direction at the time of inflation and connects the left and right surfaces of said left airbag portion, and another connecting member that is provided at a intermediate part of said right airbag portion along the front-back direction at the time of inflation and connects the left and right surfaces of said right airbag portion; and in said primary folding step, said airbag is extended along the right-left direction by separating along the right-left direction an end of a left surface of said left airbag portion that is further rearward than said connecting members and an end of a right surface of said right airbag portion that is further rearward than said connecting members, and separating along the right-left direction an end of a left surface of said left airbag portion that is further frontward than said connecting members and an end of a right surface of said right airbag portion that is further frontward than said connecting members as well as by means of extending and flattening along the right-left direction a portion where said right airbag portion and said left airbag portion face each other and surround said hollow portion.

5. The folding method of an airbag according to claim 4, wherein:

in said secondary folding step, an end portion of said left airbag portion that is further rearward than said connecting members and an end portion of said right airbag portion that is further rearward than said connecting members are folded toward a center of said primary folded body along the right-left direction, and an end portion of said left airbag portion that is further frontward than said connecting members and an end portion of said right airbag portion that is further frontward that said connecting members are folded toward a center of said primary folded body along the right-left direction.

\* \* \* \* \*